(12) United States Patent
Long et al.

(10) Patent No.: US 7,600,133 B2
(45) Date of Patent: Oct. 6, 2009

(54) BACKING UP AT LEAST ONE ENCRYPTED COMPUTER FILE

(75) Inventors: Christopher Scott Long, Chapel Hill, NC (US); Mark Andrew Smith, Los Gatos, CA (US)

(73) Assignee: Lenovo Singapore Pte. Ltd, Singapore (SG)

( * ) Notice: Subject to any disclaimer, the term of this patent is extended or adjusted under 35 U.S.C. 154(b) by 915 days.

(21) Appl. No.: 10/906,568

(22) Filed: Feb. 24, 2005

(65) Prior Publication Data

US 2006/0190502 A1 Aug. 24, 2006

(51) Int. Cl.
*G06F 11/30* (2006.01)
(52) U.S. Cl. ...................... 713/193; 707/204
(58) Field of Classification Search .............. 713/164, 713/165, 167, 189, 193; 707/204, 202
See application file for complete search history.

(56) References Cited

U.S. PATENT DOCUMENTS

| | | | | |
|---|---|---|---|---|
| 5,974,563 | A * | 10/1999 | Beeler, Jr. ................... | 714/5 |
| 5,978,481 | A * | 11/1999 | Ganesan et al. ............ | 380/266 |
| 6,134,660 | A * | 10/2000 | Boneh et al. ............... | 713/193 |
| 6,574,733 | B1 | 6/2003 | Langford | |
| 6,577,735 | B1 * | 6/2003 | Bharat ........................ | 380/286 |
| 7,213,158 | B2 * | 5/2007 | Bantz et al. ................ | 713/193 |
| 2004/0083245 | A1 * | 4/2004 | Beeler, Jr. .................. | 707/204 |
| 2004/0117636 | A1 | 6/2004 | Cheng | |
| 2005/0060356 | A1 * | 3/2005 | Saika ......................... | 707/204 |
| 2005/0228836 | A1 * | 10/2005 | Bacastow et al. ........... | 707/204 |

OTHER PUBLICATIONS

Bragg, Roberta "Hardening Windows Systems", Aug. 5, 2004, pp. 357-360.*

* cited by examiner

*Primary Examiner*—Beemnet W Dada
(74) *Attorney, Agent, or Firm*—Carlos Munoz-Bustamante; Leonard T. Guzman

(57) ABSTRACT

The present invention provides a method and system of backing up at least one encrypted computer file encrypted by an encryption filter driver running on an operating system of a computer system and restoring at least one encrypted computer file encrypted by an encryption filter driver running on an operating system of a computer system. In an exemplary embodiment, the method and system of backing up at least one encrypted computer file encrypted by an encryption filter driver running on an operating system of a computer system include (1) receiving the filename of the encrypted computer file, (2) starting a backup process for the encrypted computer file, (3) disabling the encryption filter driver for the backup process, (4) backing up the encrypted computer file via the backup process, and (5) reenabling the encryption filter driver for the backup process.

32 Claims, 24 Drawing Sheets

BACKING UP AT LEAST ONE ENCRYPTED COMPUTER FILE

FIELD OF THE INVENTION

The present invention relates to operating systems, and particularly relates to a method and system of backing up at least one encrypted computer file encrypted by an encryption filter driver running on an operating system of a computer system and restoring at least one encrypted computer file encrypted by an encryption filter driver running on an operating system of a computer system. A computer system may include an encryption filter driver which runs on the operating system of the computer system. For example, IBM Corporation (hereinafter "IBM") has created an encryption filter driver called IBM File and Folder Encryption (hereinafter "FFE") that runs on Microsoft Corporation's (hereinafter "Microsoft") Microsoft Windows (hereinafter "Windows") operating system of a computer system. FFE utilizes an IBM Embedded Security Subsystem. FFE intercepts all computer file requests to the underlying computer filesystem of the computer system and allows for the encrypting of data in the computer files to disk.

BACKGROUND OF THE INVENTION

With FFE, as the data in a computer file is being written to disk, for example in a computer file backup application, (1) the data is encrypted on disk and (2) additional encryption metadata is stored on disk as an invisible part of the filename of the computer file. The additional encryption metadata for the computer file can also be called an encryption seed for the computer file. Also, with FFE, as the data in a computer file is being read from disk, for example when the data is accessed by a typical user application (e.g. a word processing application or an electronic mail application), the data is decrypted from disk.

Backing Up Encrypted Files

Need for Backing Up Encrypted Files in their Encrypted State

However, FFE presents a problem for computer file backup applications or processes. In a computer file backup application, it is desirable for the backup application to be able to backup encrypted files in their encrypted state such that the data in the encrypted files is not compromised. In other words, it is desirable for a computer file backup system to be able to retrieve, for each encrypted computer file, (1) the encrypted data in the encrypted computer file and (2) the encryption metadata for the encrypted computer file, for a computer file backup application.

Prior Art Backup System

Unfortunately, as shown in prior art FIG. 1A, in a typical prior art computer file backup system, the encryption filter driver does not have a provision for disabling itself just for a computer file backup application or process. In other words, as a default, the encryption filter driver is always enabled. As a result, the prior art computer file backup system is unable to backup encrypted files in their encrypted state.

As shown in prior art FIG. 1B, another type of prior art computer file backup system requires the use of a full set of Application Programming Interface (API) routines that are specific to the operating system to get the encrypted data and the metadata from the computer system. For example, Microsoft's Encrypting File System (hereinafter "EFS") requires the use of the following operating system-specific APIs:

1. OpenEncryptedFileRaw;
2. ReadEncryptedFileRaw; and
3. CloseEncryptedFileRaw.

Restoring Encrypted Files

Need for Restoring Encrypted Files in their Encrypted State

In addition, FFE presents a problem for computer file restore applications or processes. In a computer file restore application, it is desirable for the restore application to be able to restore encrypted files in their encrypted state such that the data in the encrypted files is not compromised. In other words, it is desirable for a computer file restore system to be able to retrieve, for each encrypted computer file, (1) the encrypted data in the encrypted computer file and (2) the encryption metadata for the encrypted computer file, for a computer file restore application.

Prior Art Restore System

Unfortunately, as shown in prior art FIG. 1C, in a typical prior art computer file restore system, the encryption filter driver does not have a provision for disabling itself just for a computer file restore application or process. In other words, as a default, the encryption filter driver is always enabled. As a result, the prior art computer file restore system is unable to restore encrypted files in their encrypted state.

As shown in prior art FIG. 1D, another type of prior art computer file restore system requires the use of a full set of Application Programming Interface (API) routines that are specific to the operating system to place the encrypted data and the metadata back into the computer system. For example, Microsoft's Encrypting File System (hereinafter "EFS") requires the use of the following operating system-specific APIs:

1. OpenEncryptedFileRaw;
2. ReadEncryptedFileRaw; and
3. CloseEncryptedFileRaw.

Therefore, an improved method and system of backing up at least one encrypted computer file encrypted by an encryption filter driver running on an operating system of a computer system and restoring at least one encrypted computer file encrypted by an encryption filter driver running on an operating system of a computer system is needed.

SUMMARY OF THE INVENTION

The present invention provides a method and system of backing up at least one encrypted computer file encrypted by an encryption filter driver running on an operating system of a computer system and restoring at least one encrypted computer file encrypted by an encryption filter driver running on an operating system of a computer system. In an exemplary embodiment, the method and system of backing up at least one encrypted computer file encrypted by an encryption filter driver running on an operating system of a computer system include (1) receiving the filename of the encrypted computer file, (2) starting a backup process for the encrypted computer file, (3) disabling the encryption filter driver for the backup process, (4) backing up the encrypted computer file via the backup process, and (5) reenabling the encryption filter driver for the backup process.

In an exemplary embodiment, the disabling includes sending an IOCTL request to the encryption filter driver for the backup process such that the encryption filter driver will not filter filesystem requests from the backup process. In a further embodiment, the disabling further includes (a) storing the process identifier of the backup process in a storage location and (b) allowing for the processing without filtering of filesystem requests to the encryption filter driver that have process identifiers matching entries stored in the storage location. In an exemplary embodiment, the backing up includes (a) retrieving encrypted data bytes in the encrypted computer file, (b) obtaining metadata stored in the filename of the encrypted computer file, and (c) storing the encrypted data bytes and the metadata to disk as a backup of the encrypted computer file.

In an exemplary embodiment, the reenabling includes making the encryption filter driver filter filesystem requests from the backup process. In a specific embodiment, the making includes closing the device handle of the encryption filter driver for the backup process. In a specific embodiment, the making includes sending an IOCTL request to the encryption filter driver for the backup process such that the encryption filter driver will filter filesystem requests from the backup process. In a further embodiment, the reenabling further includes (a) removing the process identifier of the backup process from a storage location and (b) allowing for the processing with filtering of all filesystem requests to the encryption filter driver.

The present invention also provides method and system of restoring at least one encrypted computer file encrypted by an encryption filter driver running on an operating system of a computer system. In an exemplary embodiment, the method and system of restoring at least one encrypted computer file encrypted by an encryption filter driver running on an operating system of a computer system include (1) receiving the filename of the encrypted computer file, (2) starting a restore process for the encrypted computer file, (3) if the encryption filter driver is not enabled, copying the encrypted computer file via the restore process, and (4) if the encryption filter driver is enabled, (a) disabling the encryption filter driver for the restore process, (b) restoring the encrypted computer file via the restore process, and (c) reenabling the encryption filter driver for the restore process.

In an exemplary embodiment, the disabling includes sending an IOCTL request to the encryption filter driver for the restore process such that the encryption filter driver will not filter filesystem requests from the restore process. In a further embodiment, the disabling further includes (a) storing the process identifier of the restore process in a storage location and (b) allowing for the processing without filtering of filesystem requests to the encryption filter driver that have process identifiers matching entries stored in the storage location. In an exemplary embodiment, the restoring includes (a) retrieving encrypted data bytes in the encrypted computer file from a backup of the encrypted computer file, (b) obtaining metadata stored in the filename of the backup of the encrypted computer file, and (c) copying the encrypted data bytes and the metadata to a target restore disk as a restore of the encrypted computer file.

In an exemplary embodiment, the reenabling includes making the encryption filter driver filter filesystem requests from the restore process. In a specific embodiment, the making includes closing the device handle of the encryption filter driver for the restore process. In a specific embodiment, the making includes sending an IOCTL request to the encryption filter driver for the restore process such that the encryption filter driver will filter filesystem requests from the restore process. In a further embodiment, the reenabling further includes (a) removing the process identifier of the restore process from a storage location and (b) allowing for the processing with filtering of all filesystem requests to the encryption filter driver.

The present invention also provides a computer program product usable with a programmable computer having readable program code embodied therein of backing up at least one encrypted computer file encrypted by an encryption filter driver running on an operating system of a computer system. In an exemplary embodiment, the computer program product includes (1) computer readable code for receiving the filename of the encrypted computer file, (2) computer readable code for starting a backup process for the encrypted computer file, (3) computer readable code for disabling the encryption filter driver for the backup process, (4) computer readable code for backing up the encrypted computer file via the backup process, and (5) computer readable code for reenabling the encryption filter driver for the backup process.

The present invention also provides a method of providing a service to back up at least one encrypted computer file encrypted by an encryption filter driver running on an operating system of a computer system. In an exemplary embodiment, the method includes (1) receiving the filename of the encrypted computer file, (2) starting a backup process for the encrypted computer file, (3) disabling the encryption filter driver for the backup process, (4) backing up the encrypted computer file via the backup process, and (5) reenabling the encryption filter driver for the backup process.

The present invention also provides a computer program product usable with a programmable computer having readable program code embodied therein of restoring at least one encrypted computer file encrypted by an encryption filter driver running on an operating system of a computer system. In an exemplary embodiment, the computer program product includes (1) computer readable code for receiving the filename of the encrypted computer file, (2) computer readable code for starting a restore process for the encrypted computer file, (3) computer readable code for copying, if the encryption filter driver is not enabled, the encrypted computer file via the restore process, (4) computer readable code for disabling, if the encryption filter driver is enabled, the encryption filter driver for the restore process, (5) computer readable code for restoring, if the encryption filter driver is enabled, the encrypted computer file via the restore process, and (6) computer readable code for reenabling, if the encryption filter driver is enabled, the encryption filter driver for the restore process.

The present invention also provides a method of providing a service to restore at least one encrypted computer file encrypted by an encryption filter driver running on an operating system of a computer system. In an exemplary embodiment, the method includes (1) receiving the filename of the encrypted computer file, (2) starting a restore process for the encrypted computer file, (3) if the encryption filter driver is not enabled, copying the encrypted computer file via the restore process, and (4) if the encryption filter driver is enabled, (a) disabling the encryption filter driver for the restore process, (b) restoring the encrypted computer file via the restore process, and (c) reenabling the encryption filter driver for the restore process.

THE FIGURES

DETAILED DESCRIPTION OF THE INVENTION

The present invention provides method and system of backing up at least one encrypted computer file encrypted by an encryption filter driver running on an operating system of a computer system and restoring at least one encrypted computer file encrypted by an encryption filter driver running on an operating system of a computer system.

Backing Up Encrypted Computer Files

The present invention provides method and system of backing up at least one encrypted computer file encrypted by an encryption filter driver running on an operating system of a computer system. In an exemplary embodiment, the encryption filter driver is FFE. In an exemplary embodiment, the operating system is the Windows operating system. In an exemplary embodiment, the method and system of backing up at least one encrypted computer file encrypted by an encryption filter driver running on an operating system of a computer system include (1) receiving the filename of the encrypted computer file, (2) starting a backup process for the encrypted computer file, (3) disabling the encryption filter driver for the backup process, (4) backing up the encrypted computer file via the backup process, and (5) reenabling the encryption filter driver for the backup process.

Figure 1A:
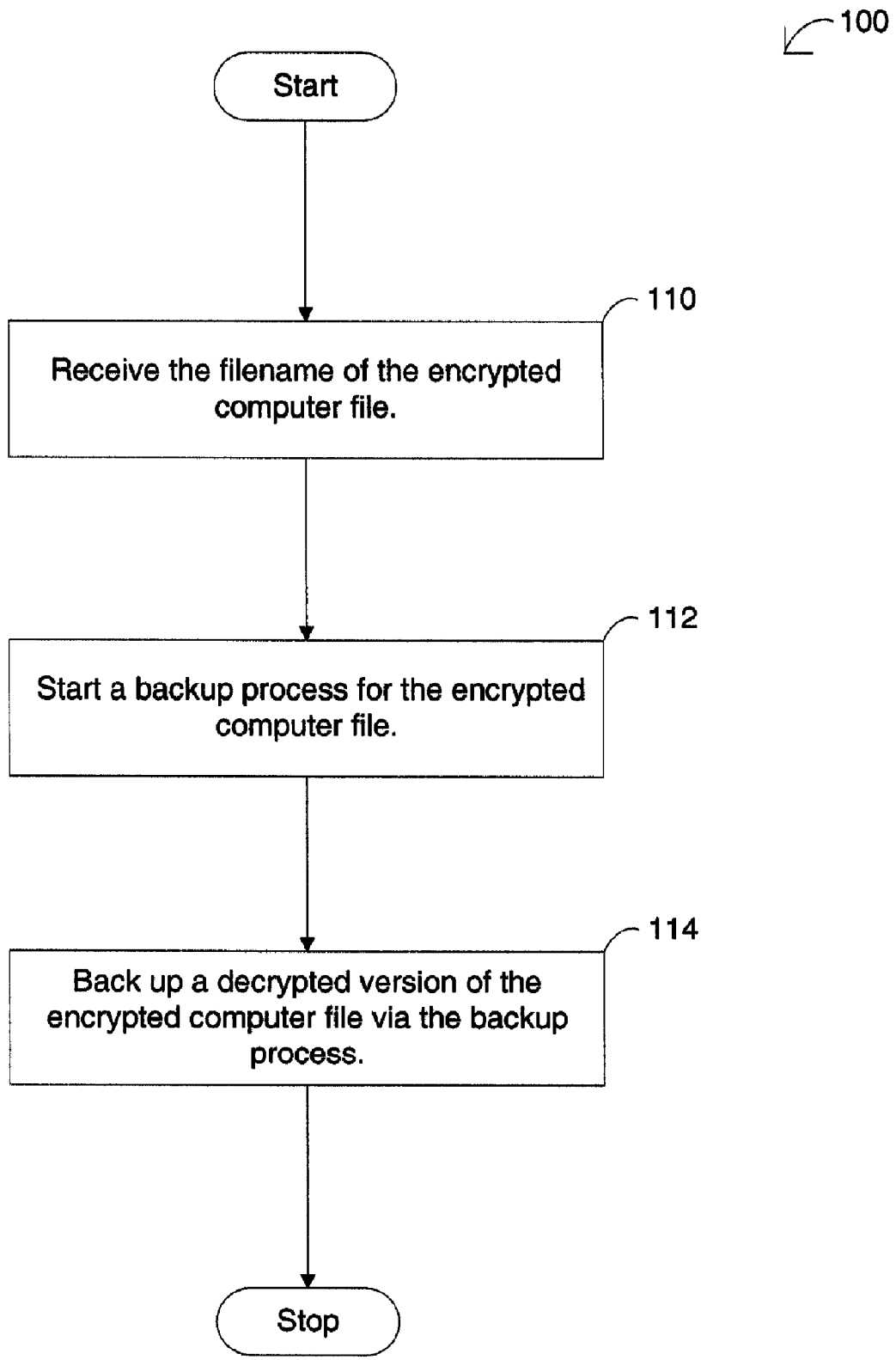
FIG. 1A is a flowchart of a prior art technique.
Figure 1B:
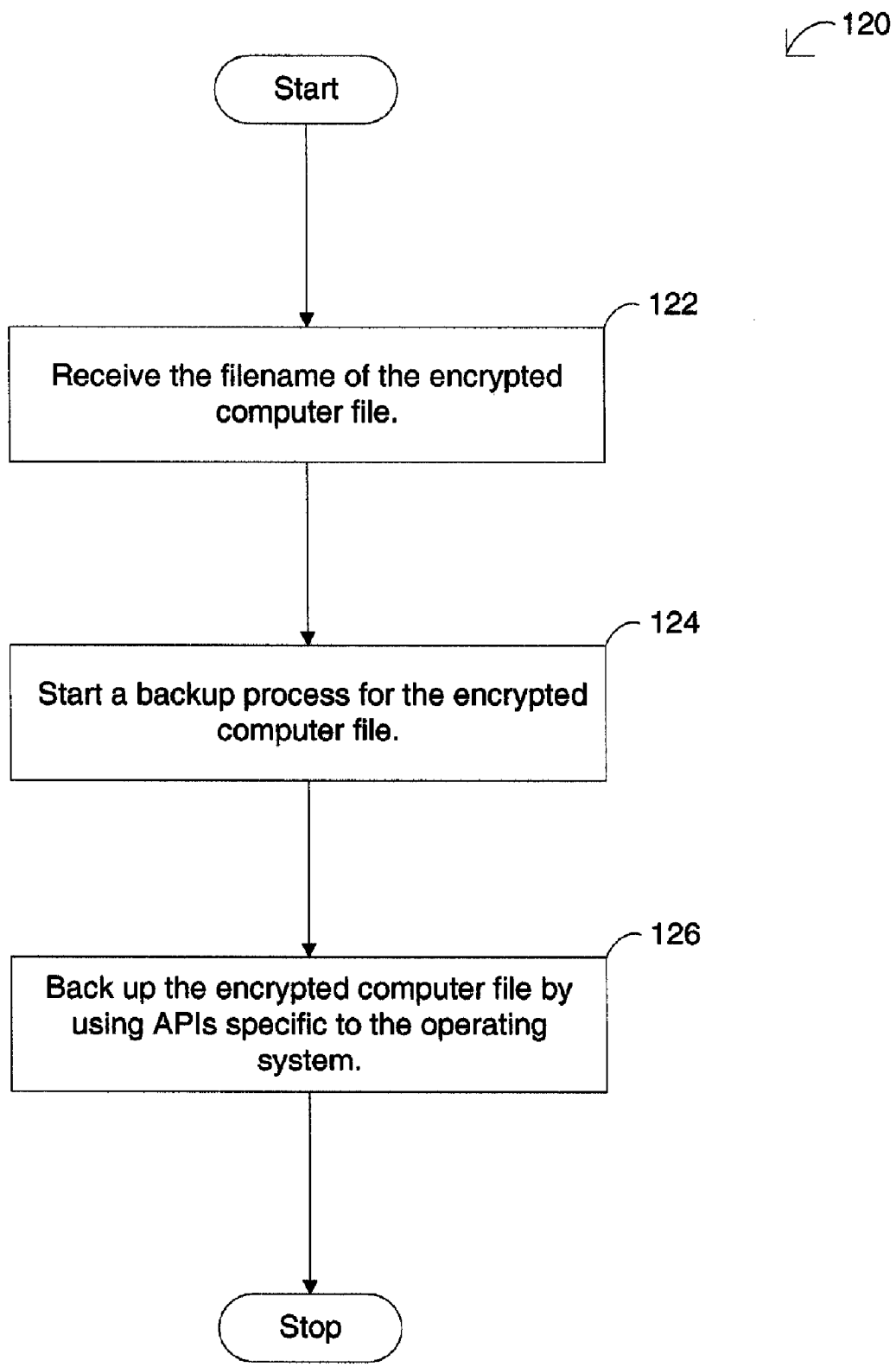
FIG. 1B is a flowchart of a prior art technique.
Figure 1C:
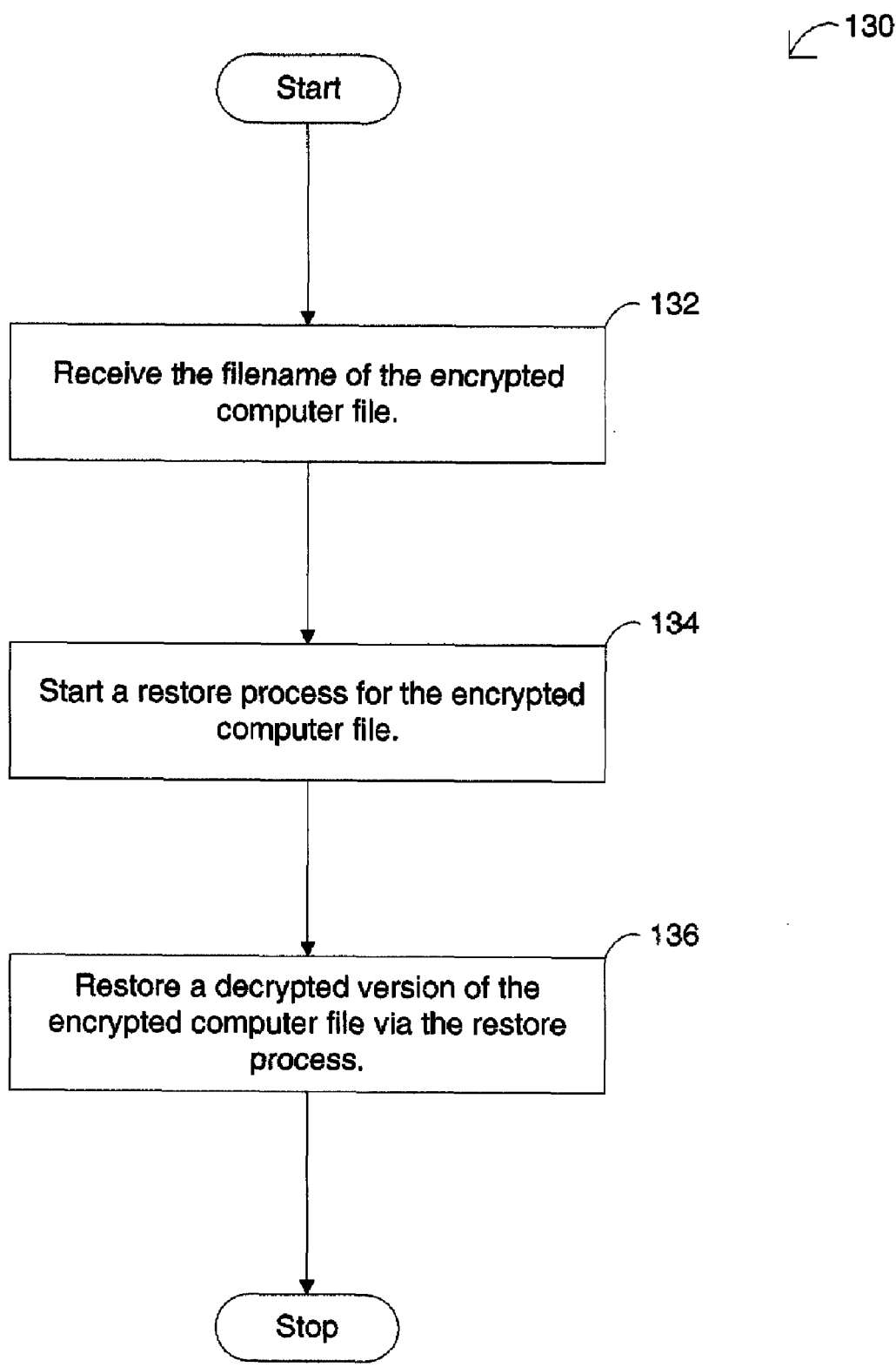
FIG. 1C is a flowchart of a prior art technique.
Figure 1D:
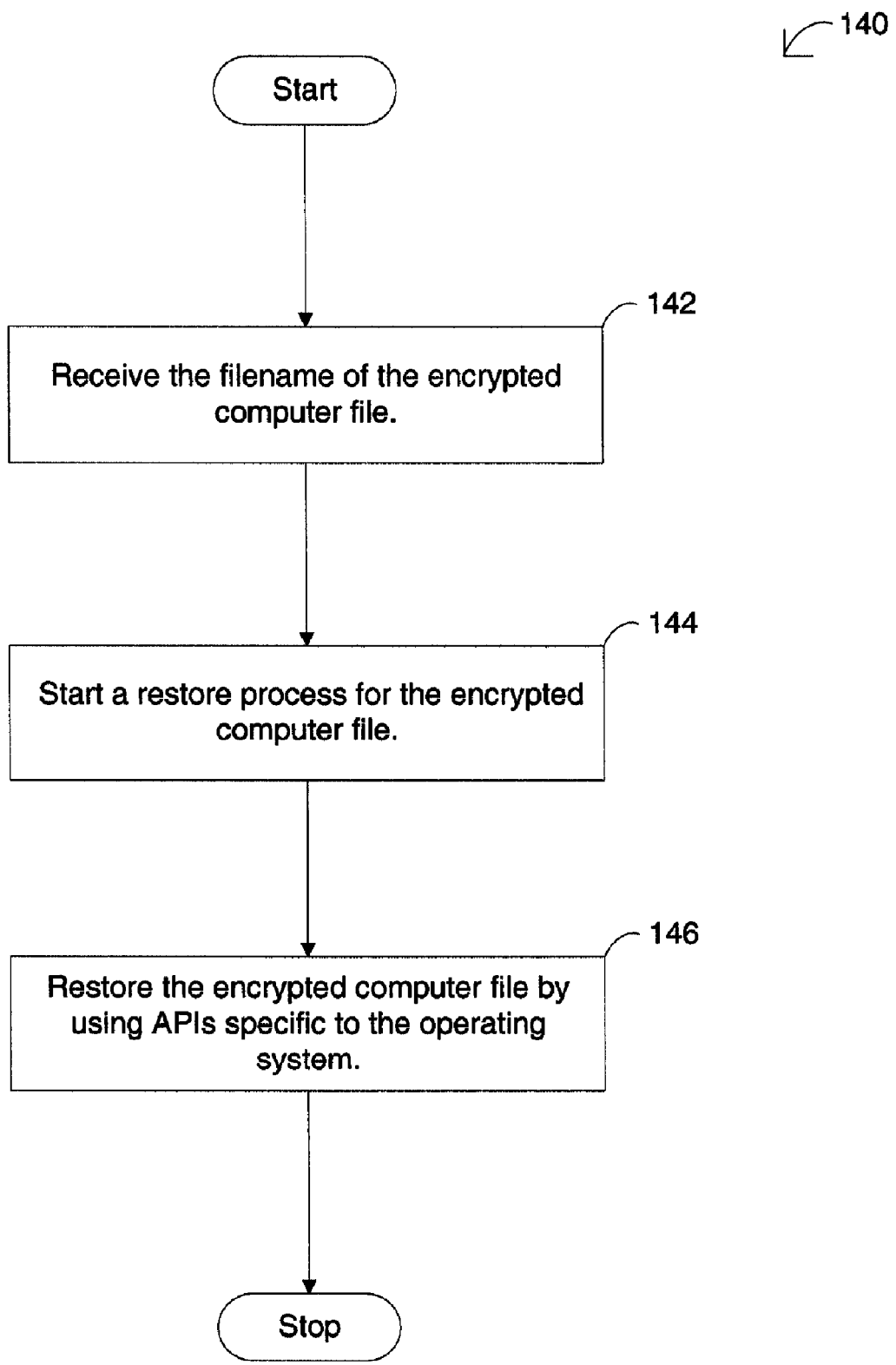
FIG. 1D is a flowchart of a prior art technique.
Figure 2A:
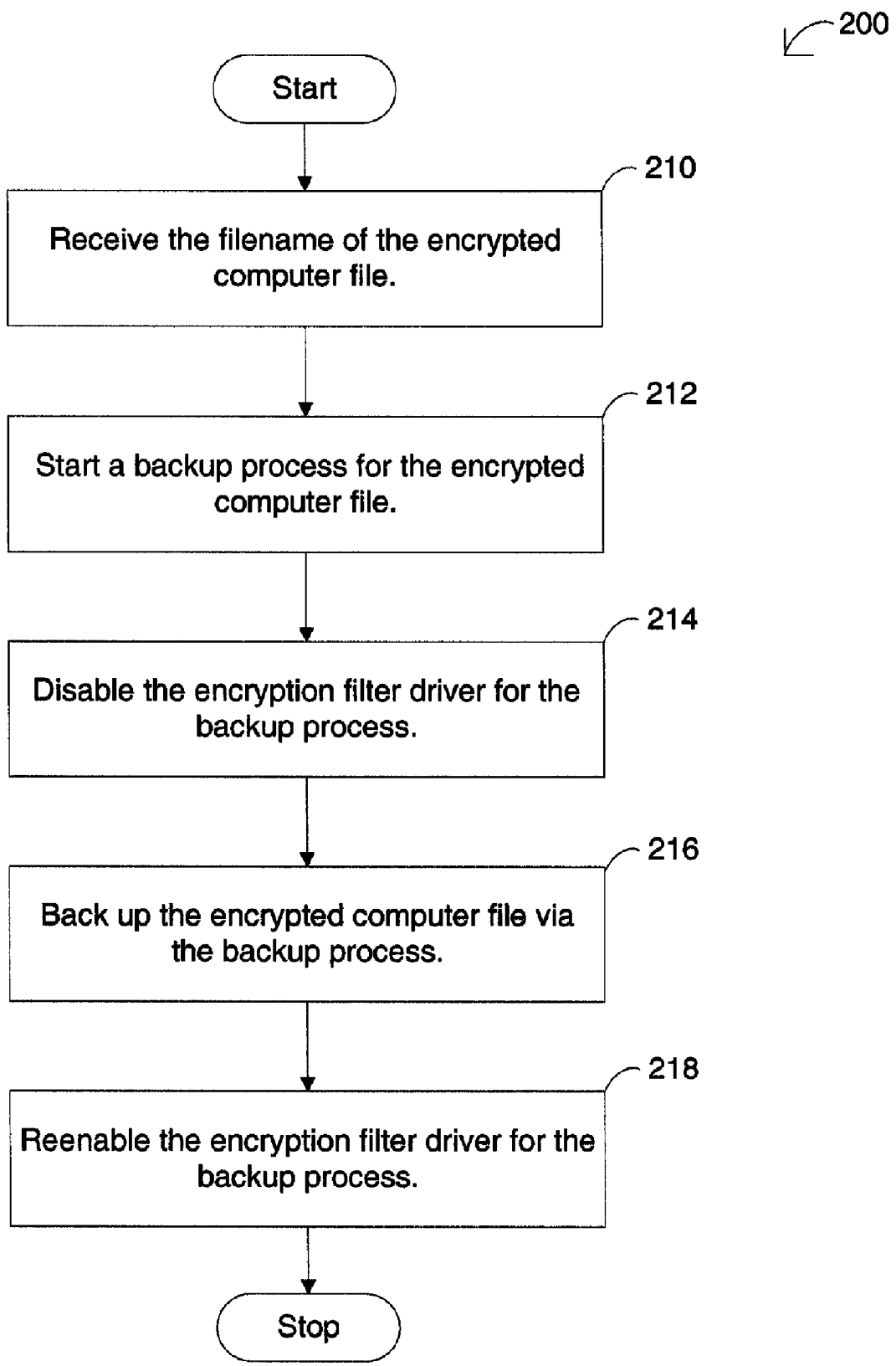
FIG. 2A is a flowchart in accordance with an exemplary embodiment of the present invention.
Figure 2B:
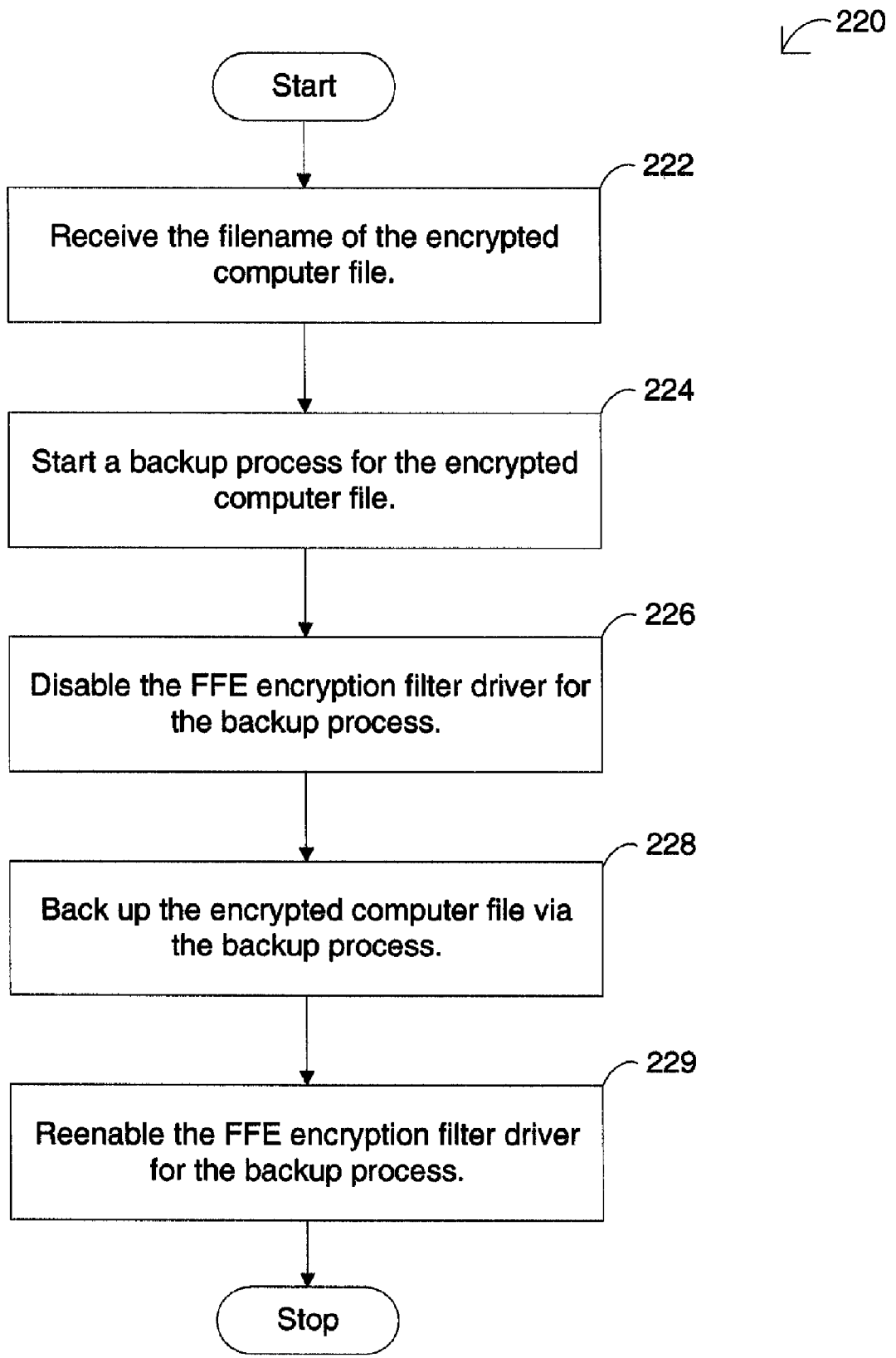
FIG. 2B is a flowchart in accordance with an exemplary embodiment of the present invention.

Referring to FIG. 2A, in an exemplary embodiment, the present invention includes a step 210 of receiving the filename of the encrypted computer file, a step 212 of starting a backup process for the encrypted computer file, a step 214 of disabling the encryption filter driver for the backup process, a step 216 of backing up the encrypted computer file via the backup process, and a step 218 of reenabling the encryption filter driver for the backup process. Referring next to FIG. 2B, in an exemplary embodiment, the present invention includes a step 222 of receiving the filename of the encrypted computer file, a step 224 of starting a backup process for the encrypted computer file, a step 226 of disabling the FFE encryption filter driver for the backup process, a step 228 of backing up the encrypted computer file via the backup process, and a step 229 of reenabling the FFE encryption filter driver for the backup process.

Disabling the Encryption Filter Driver

Figure 3A:
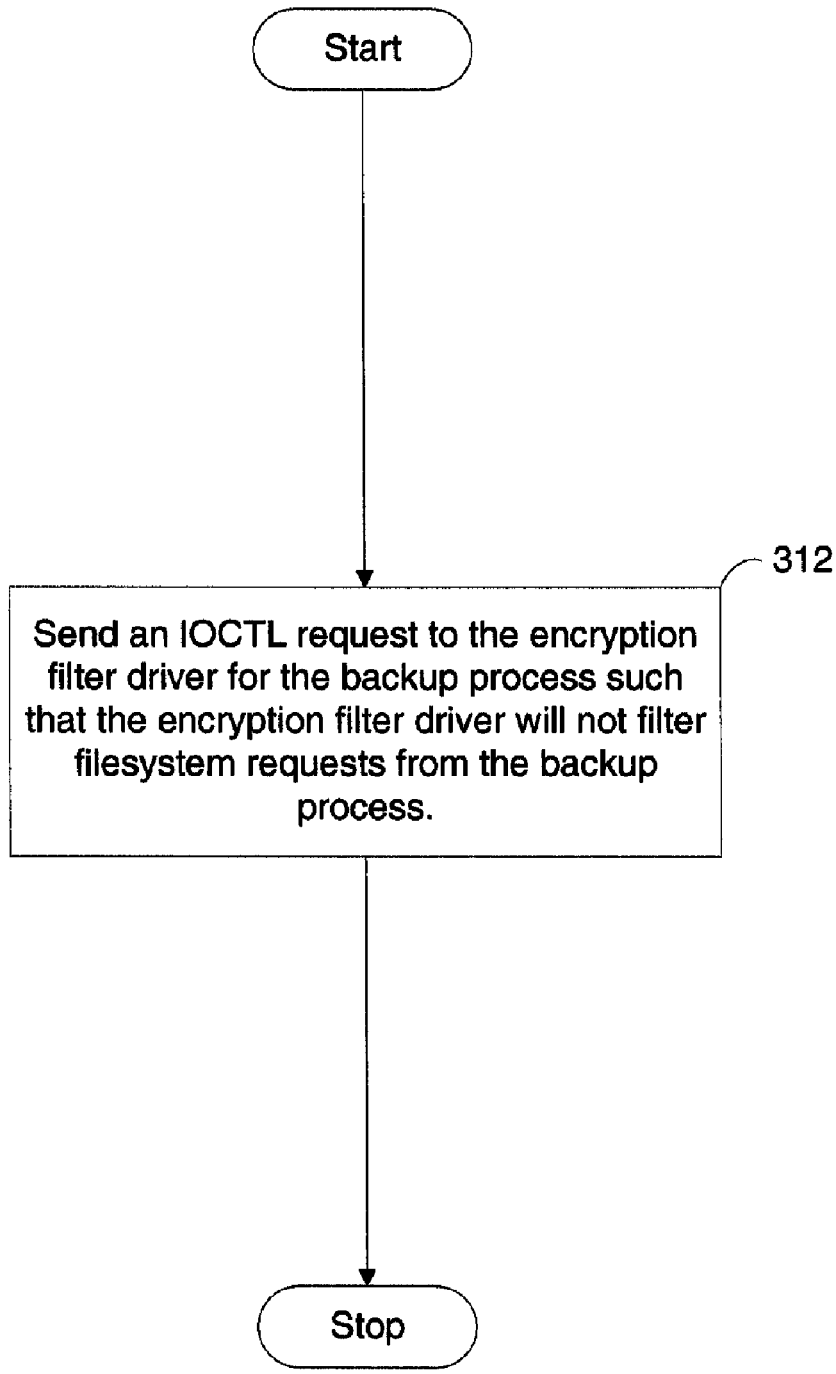
FIG. 3A is a flowchart of the disabling step in accordance with an exemplary embodiment of the present invention.

Referring next to FIG. 3A, in an exemplary embodiment, disabling step 214 includes a step 312 of sending an IOCTL request to the encryption filter driver for the backup process such that the encryption filter driver will not filter filesystem requests from the backup process. In a specific embodiment, the IOCTL is sent via Microsoft's DeviceIoControl API. In a specific embodiment, the IOCTL equals the following:

CTL_CODE(FILE_DEVICE_FFDRIVER, 0x0E, METHOD_BUFFERED, FILE_ANY_ACCESS).

In a specific embodiment, FILE_DEVICE_FFDRIVER equals 0x00008300.

Figure 3B:
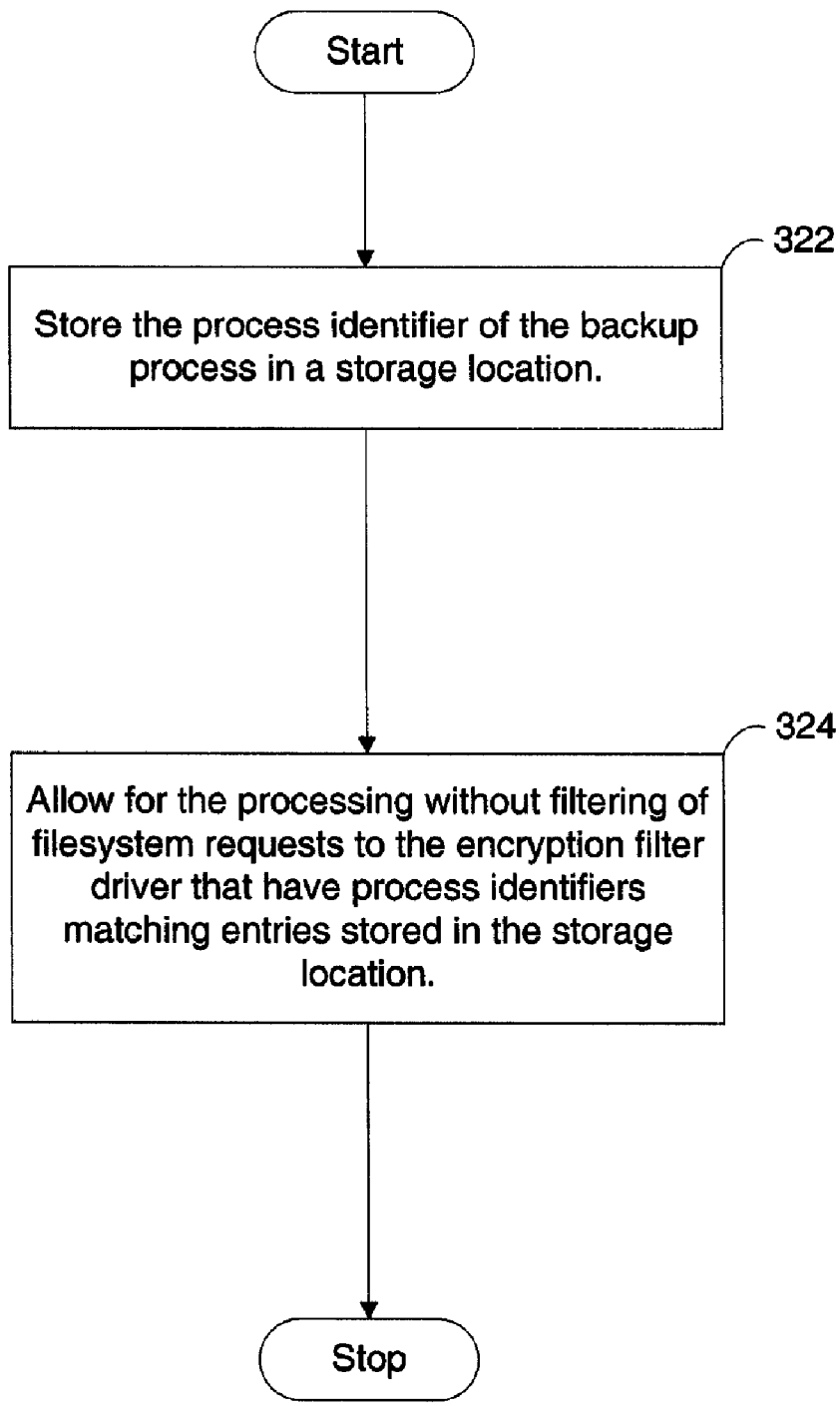
FIG. 3B is a flowchart of the disabling step in accordance with a further embodiment of the present invention.

In a further embodiment, as shown in FIG. 3B, disabling step 214 further includes a step 322 of storing the process identifier of the backup process in a storage location and a step 324 of allowing for the processing without filtering of filesystem requests to the encryption filter driver that have process identifiers matching entries stored in the storage location.

Backing Up the Encrypted Computer File

Figure 4:
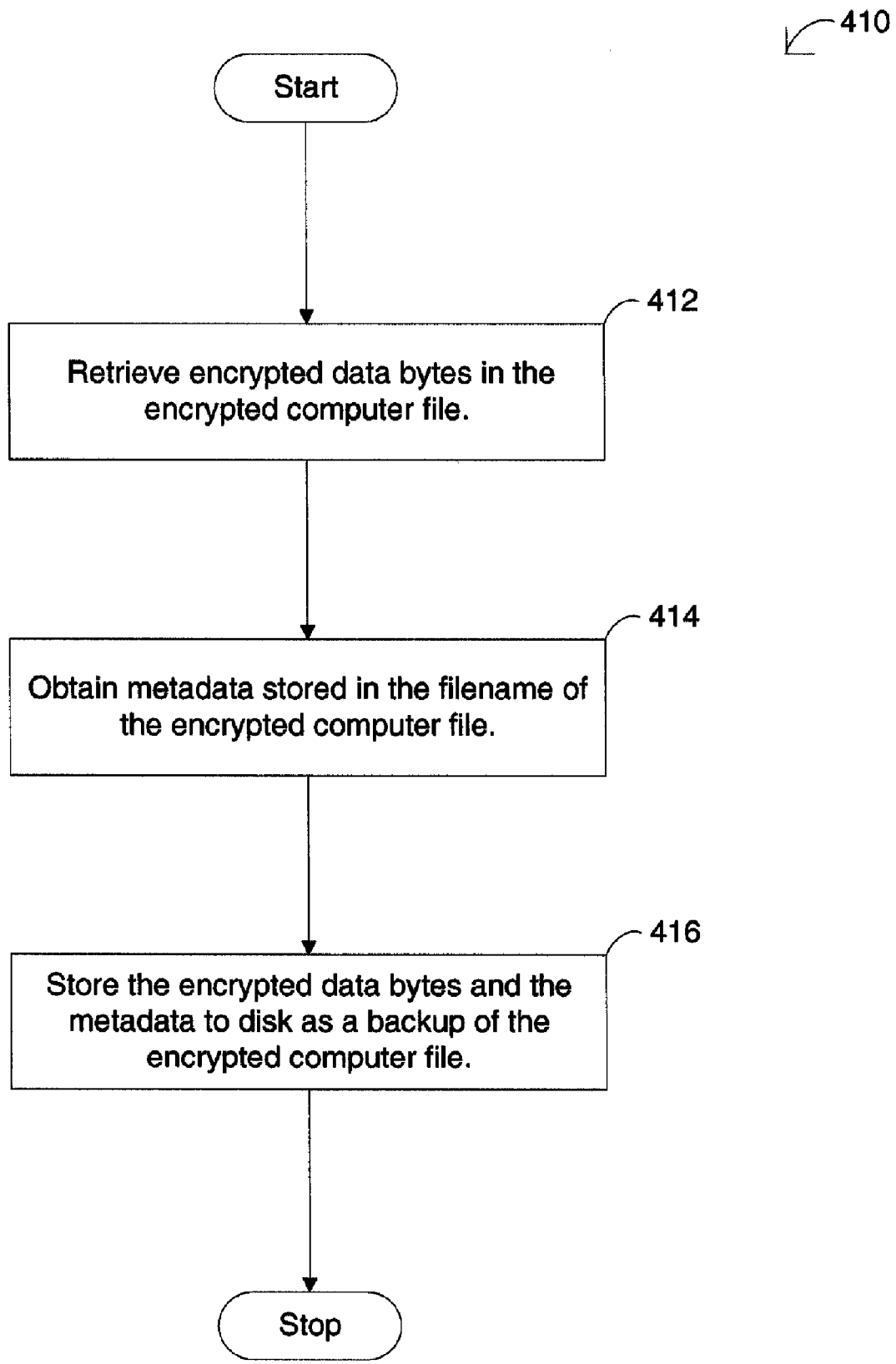
FIG. 4 is a flowchart of the backing up step in accordance with an exemplary embodiment of the present invention.

Referring next to FIG. 4, in an exemplary embodiment, backing up step 216 includes a step 412 of retrieving encrypted data bytes in the encrypted computer file, a step 414 of obtaining metadata stored in the filename of the encrypted computer file, and a step 416 of storing the encrypted data bytes and the metadata to disk as a backup of the encrypted computer file.

Reenabling the Encryption Filter Driver

Figure 5A:
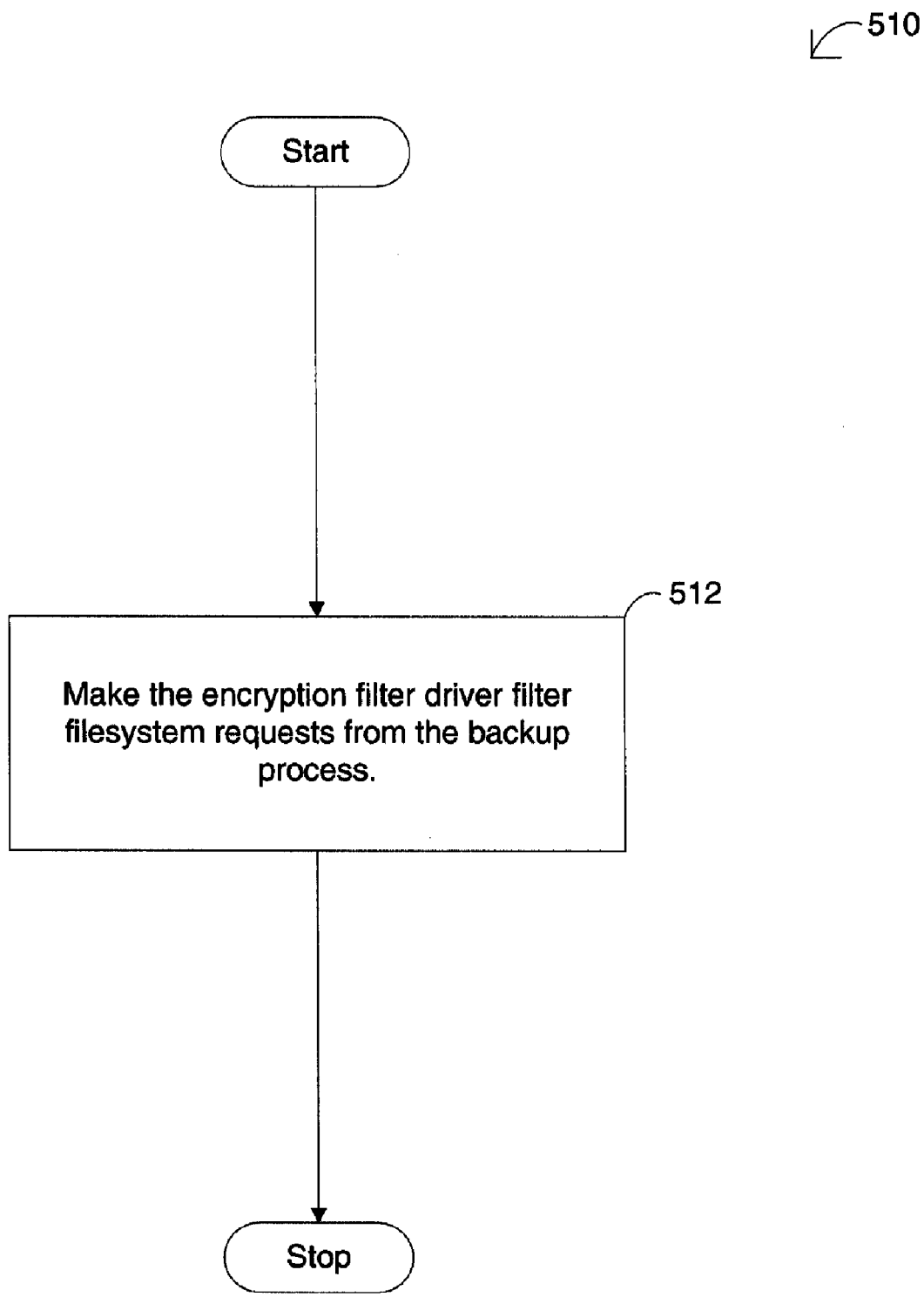
FIG. 5A is a flowchart of the reenabling step in accordance with an exemplary embodiment of the present invention.
Figure 5B:
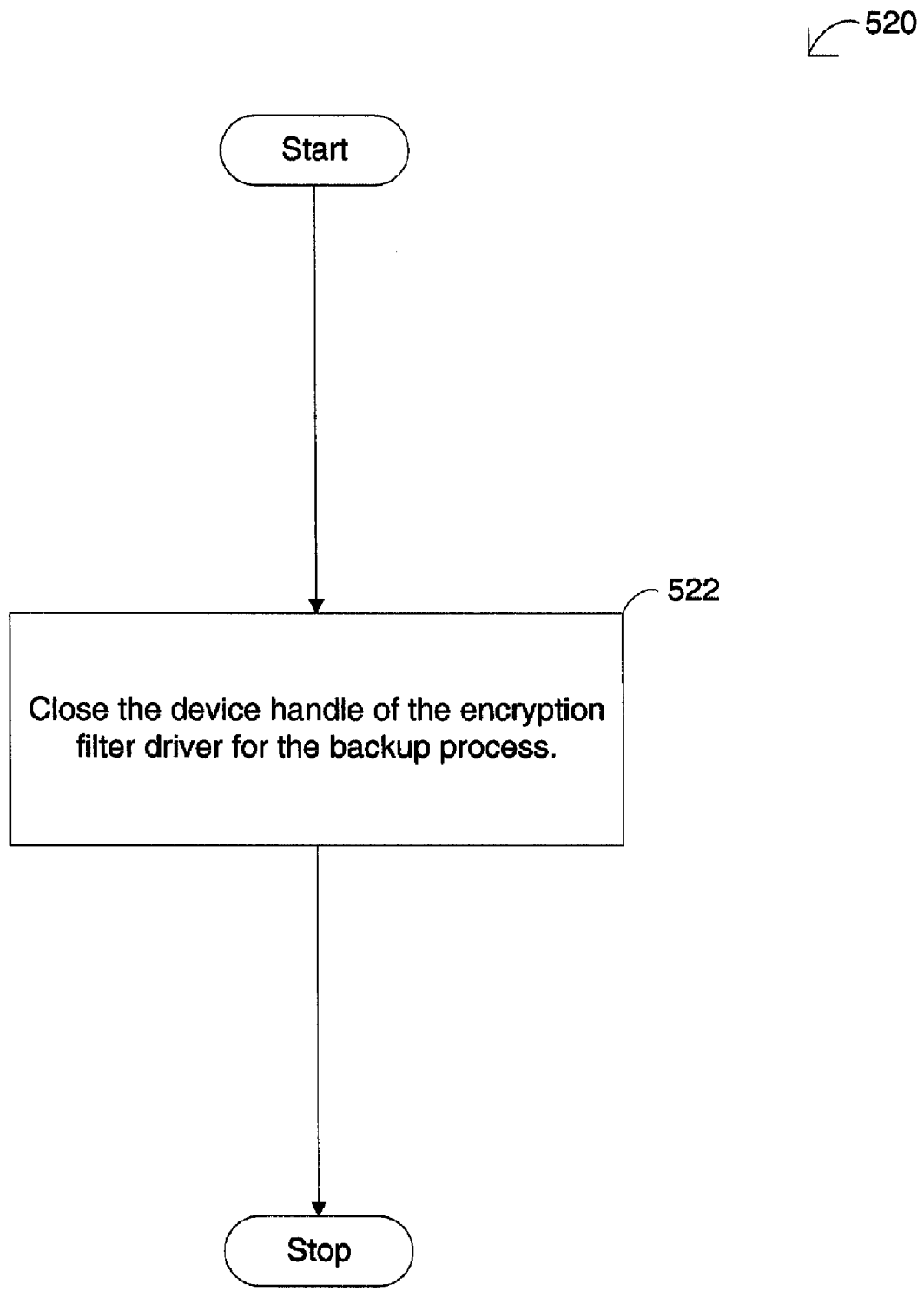
FIG. 5B is a flowchart of the making step in accordance with a specific embodiment of the present invention.

Referring next to FIG. 5A, in an exemplary embodiment, reenabling step 218 includes a step 512 of making the encryption filter driver filter filesystem requests from the backup process. In a specific embodiment, as shown in FIG. 5B, making step 512 includes a step 522 of closing the device handle of the encryption filter driver for the backup process.

Figure 5C:
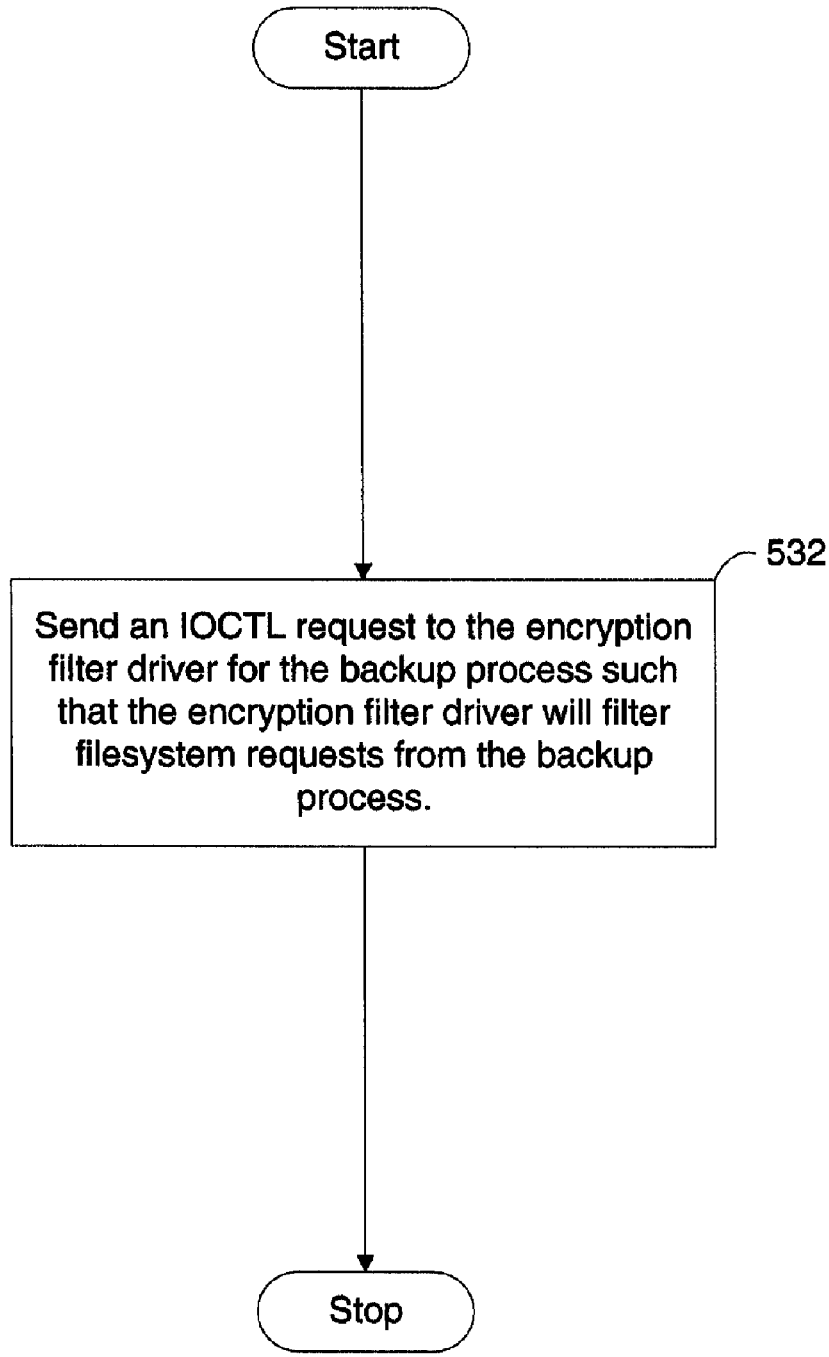
FIG. 5C is a flowchart of the making step in accordance with a specific embodiment of the present invention.

In a specific embodiment, as shown in FIG. 5C, making step 512 includes a step 532 of sending an IOCTL request to the encryption filter driver for the backup process such that the encryption filter driver will filter filesystem requests from the backup process. In a specific embodiment, the IOCTL is sent via Microsoft's DeviceIoControl API. In a specific embodiment, the IOCTL equals the following:

CTL_CODE(FILE_DEVICE_FFDRIVER, 0x0D, METHOD_BUFFERED, FILE_ANY_ACCESS).

In a specific embodiment, FILE_DEVICE_FFDRIVER equals 0x00008300.

Figure 5D:
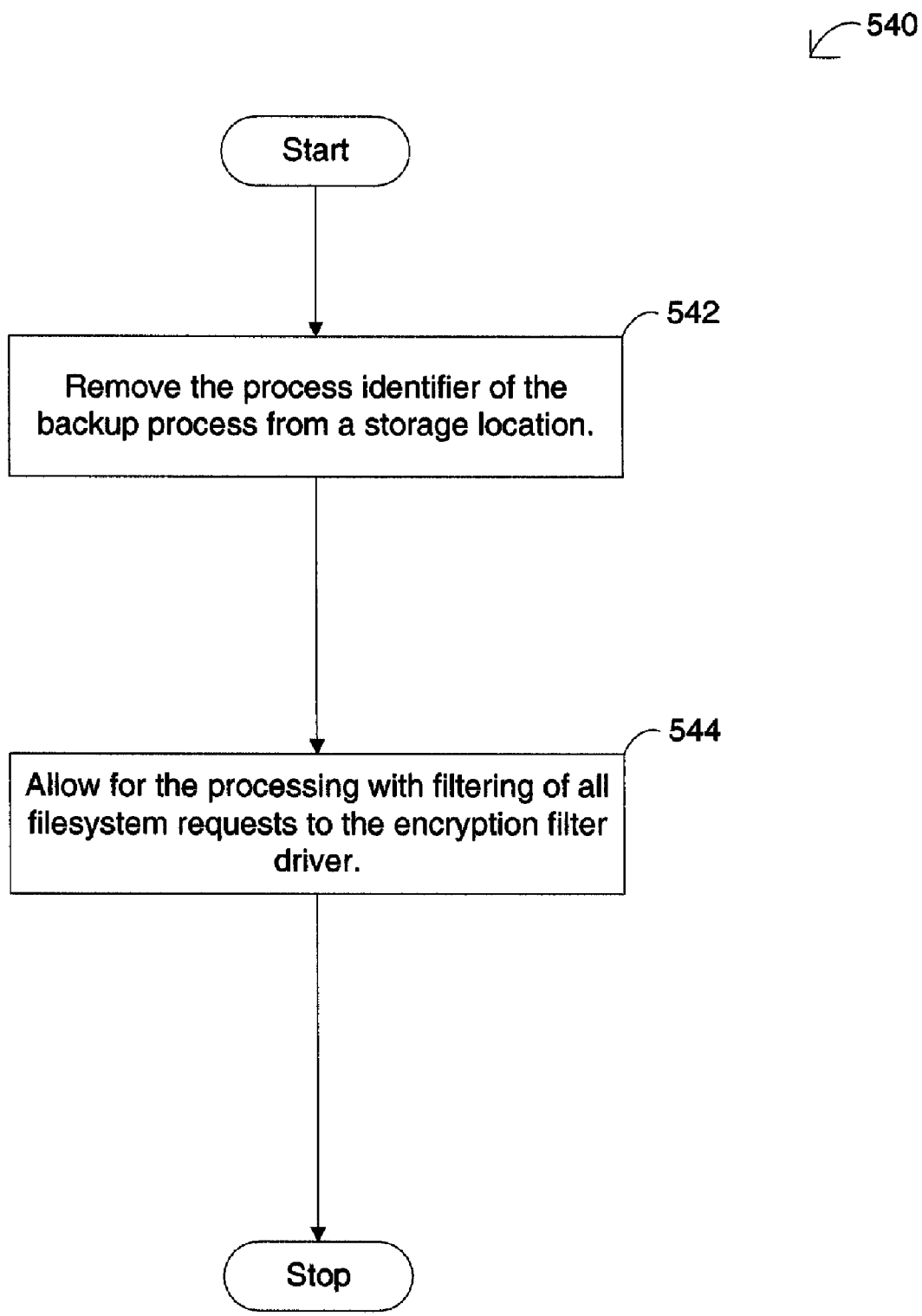
FIG. 5D is a flowchart of the reenabling step in accordance with a further embodiment of the present invention.

In a further embodiment, as shown in FIG. 5D, reenabling step 218 further includes a step 542 of removing the process identifier of the backup process from a storage location and a step 544 of allowing for the processing with filtering of all filesystem requests to the encryption filter driver.

Restoring Encrypted Computer Files

The present invention also provides method and system of restoring at least one encrypted computer file encrypted by an encryption filter driver running on an operating system of a computer system. In an exemplary embodiment, the encryption filter driver is FFE. In an exemplary embodiment, the operating system is the Windows operating system. In an exemplary embodiment, the method and system of restoring at least one encrypted computer file encrypted by an encryption filter driver running on an operating system of a computer system include (1) receiving the filename of the encrypted computer file, (2) starting a restore process for the encrypted computer file, (3) if the encryption filter driver is not enabled, copying the encrypted computer file via the restore process, and (4) if the encryption filter driver is enabled, (a) disabling the encryption filter driver for the restore process, (b) restoring the encrypted computer file via the restore process, and (c) reenabling the encryption filter driver for the restore process.

Figure 6A:
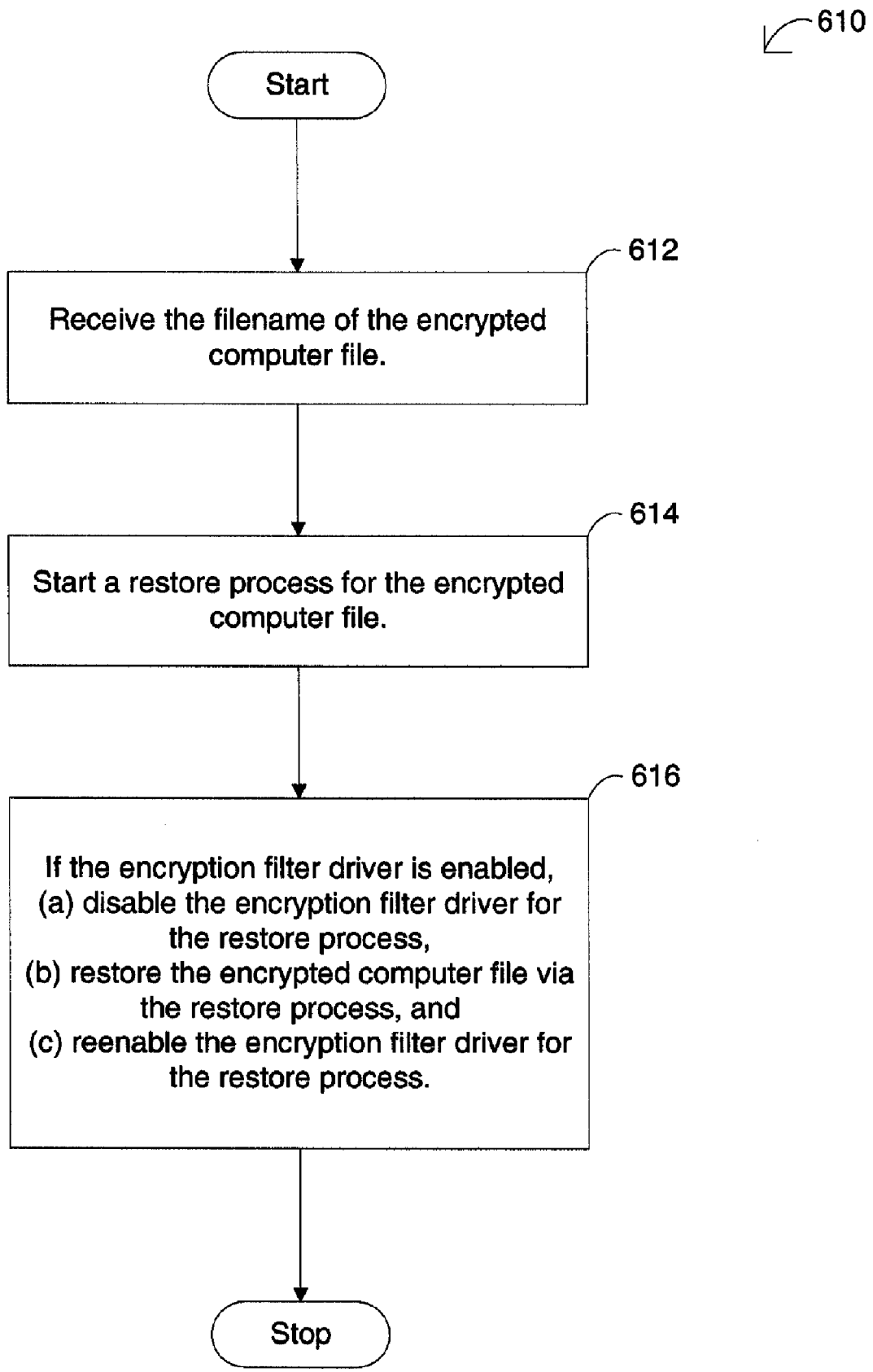
FIG. 6A is a flowchart in accordance with an exemplary embodiment of the present invention.
Figure 6B:
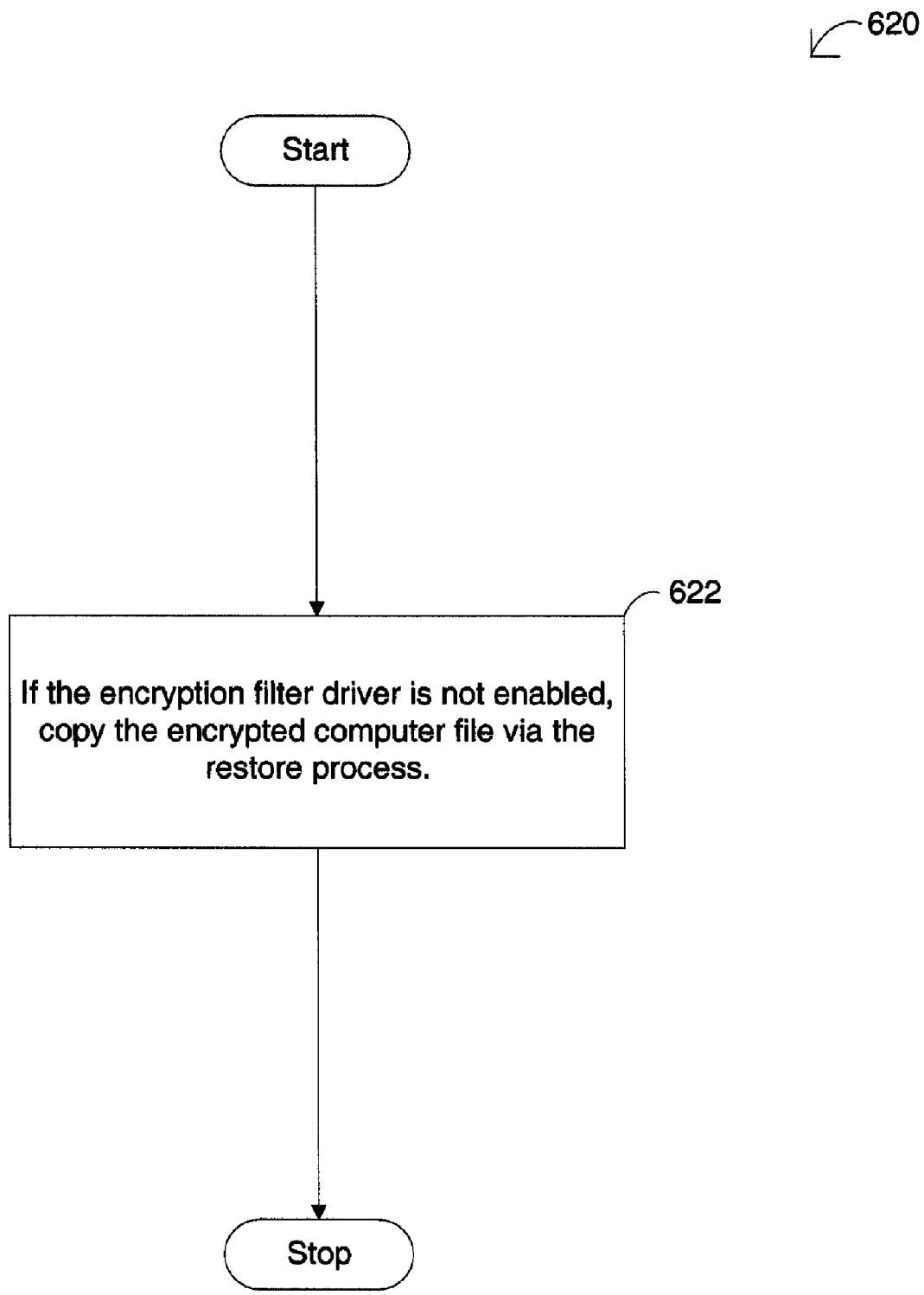
FIG. 6B is a flowchart in accordance with a further embodiment of the present invention.

Referring to FIG. 6A, in an exemplary embodiment, the present invention includes a step 612 of receiving the filename of the encrypted computer file, a step 614 of starting a restore process for the encrypted computer file, and a step 616 of, if the encryption filter driver is enabled, (a) disabling the encryption filter driver for the restore process, (b) restoring the encrypted computer file via the restore process, and (c) reenabling the encryption filter driver for the restore process. In a further embodiment, as shown in FIG. 6B, the present invention further includes a step 622 of, if the encryption filter driver is not enabled, copying the encrypted computer file via the restore process.

Figure 6C:
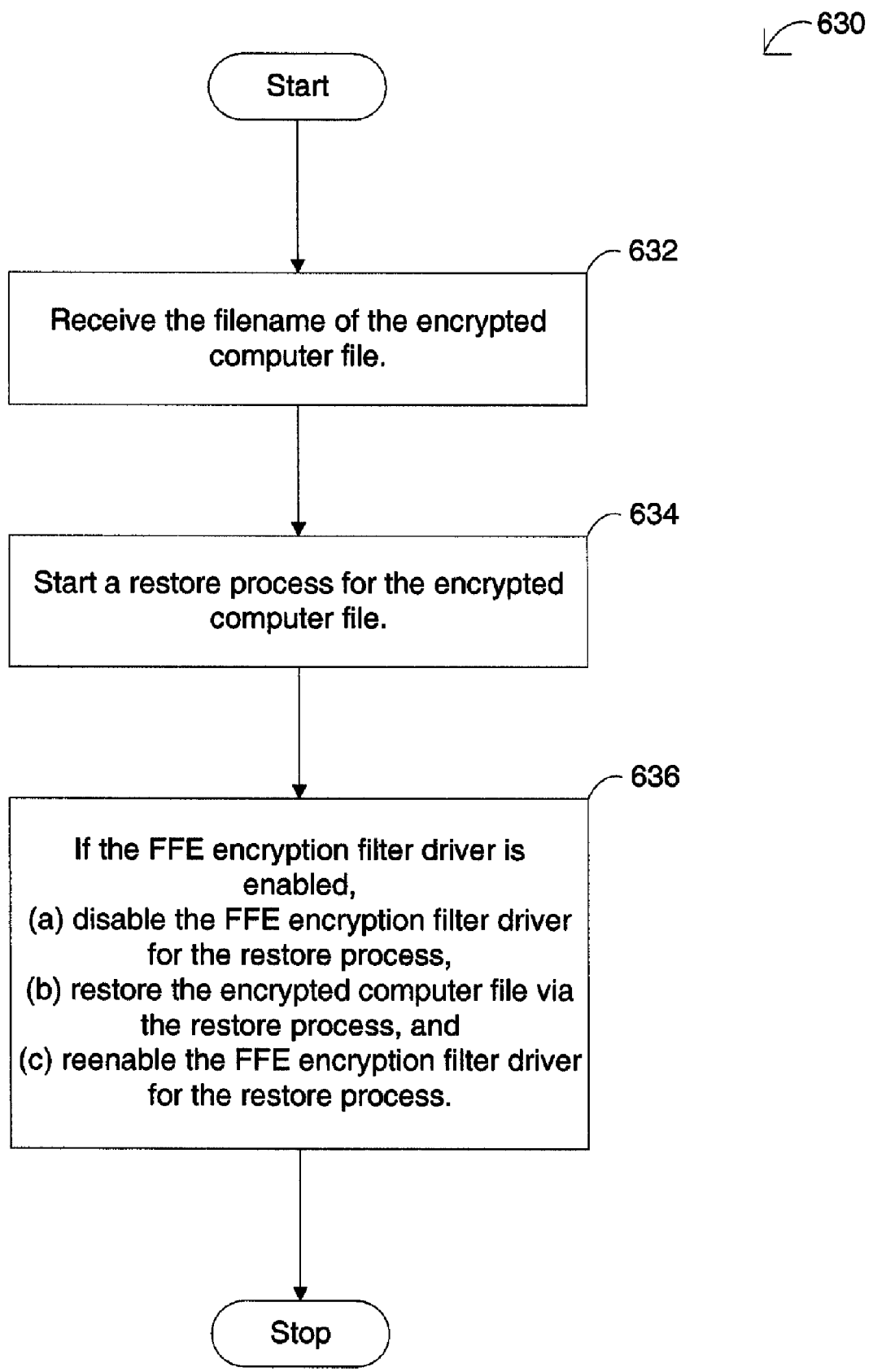
FIG. 6C is a flowchart in accordance with an exemplary embodiment of the present invention.
Figure 6D:
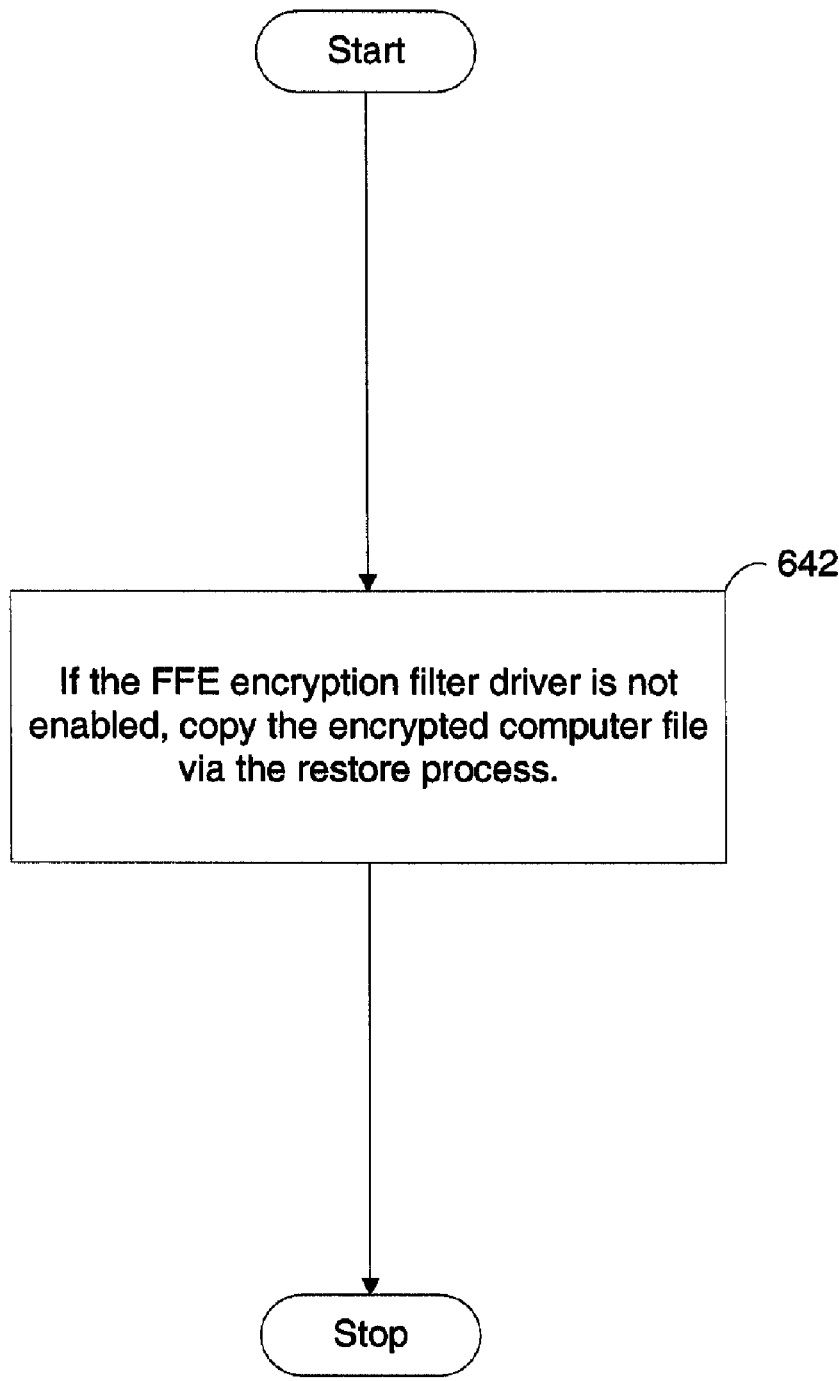
FIG. 6D is a flowchart in accordance with a further embodiment of the present invention.

Referring next to FIG. 6C, in an exemplary embodiment, the present invention includes a step 632 of receiving the filename of the encrypted computer file, a step 634 of starting a restore process for the encrypted computer file, and a step 636 of, if the FFE encryption filter driver is enabled, (a) disabling the FFE encryption filter driver for the restore process, (b) restoring the encrypted computer file via the restore process, and (c) reenabling the FFE encryption filter driver for the restore process. In a further embodiment, as shown in FIG. 6D, the present invention further includes a step 642 of, if the FFE encryption filter driver is not enabled, copying the encrypted computer file via the restore process.

Disabling the Encryption Filter Driver

Figure 7A:
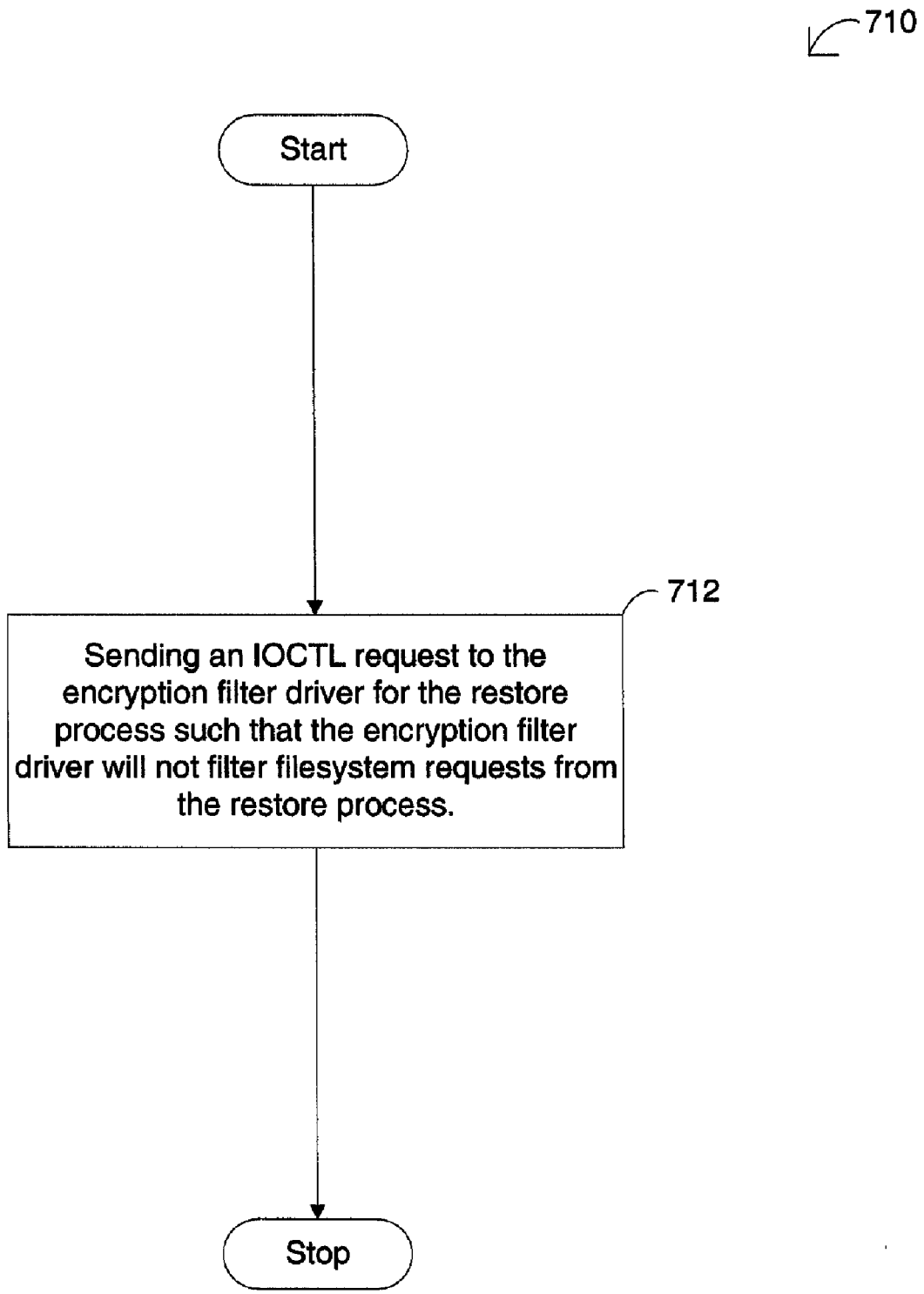
FIG. 7A is a flowchart of the disabling in accordance with an exemplary embodiment of the present invention.

Referring next to FIG. 7A, in an exemplary embodiment, the disabling includes a step 712 of sending an IOCTL request to the encryption filter driver for the restore process such that the encryption filter driver will not filter filesystem requests from the restore process. In a specific embodiment, the IOCTL is sent via Microsoft's DeviceIoControl API. In a specific embodiment, the IOCTL equals the following:

CTL_CODE(FILE_DEVICE_FFDRIVER, 0x0E, METHOD_BUFFERED, FILE_ANY_ACCESS).

In a specific embodiment, FILE_DEVICE_FFDRIVER equals 0x00008300.

Figure 7B:
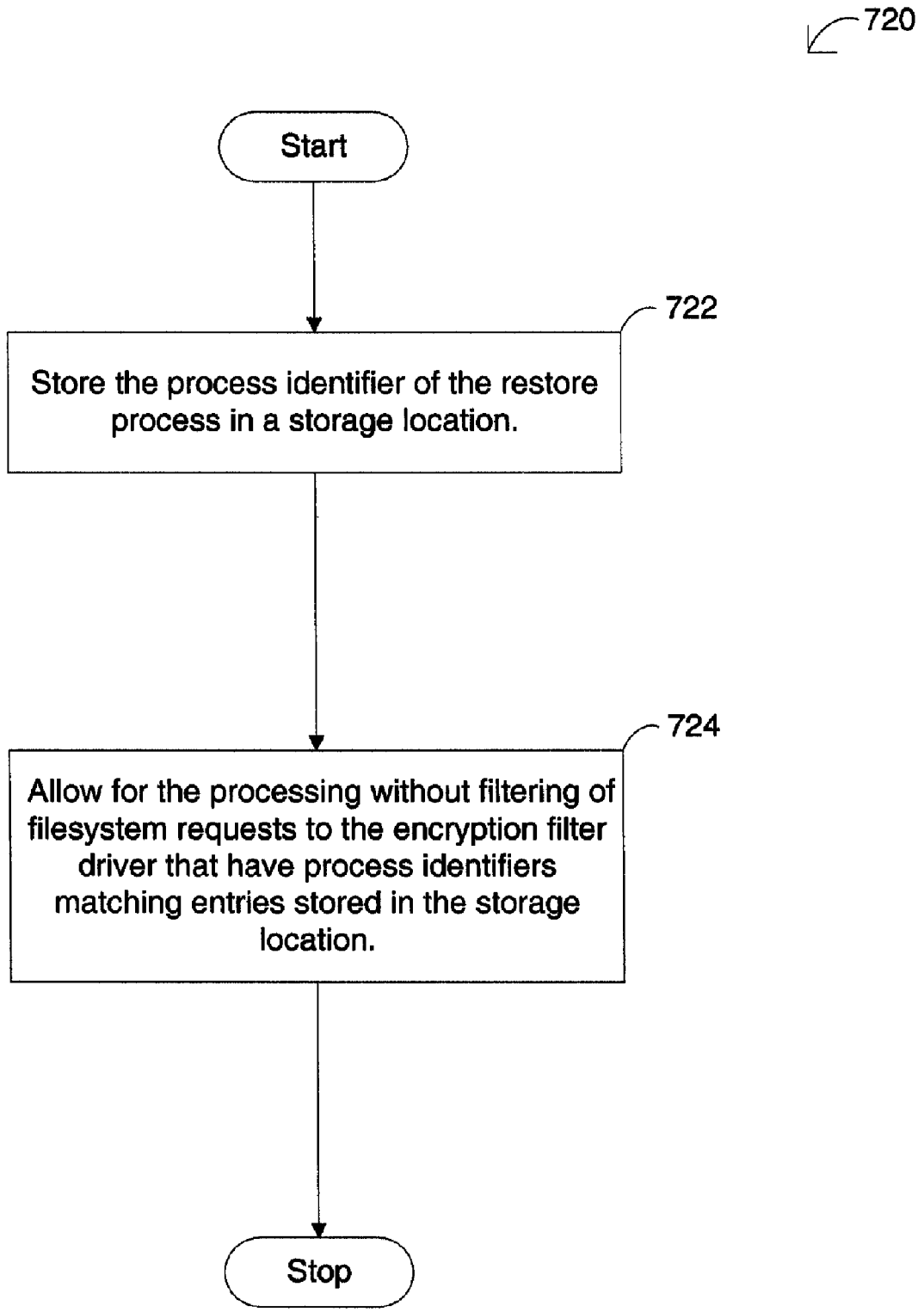
FIG. 7B is a flowchart of the disabling in accordance with a further embodiment of the present invention.

In a further embodiment, as shown in FIG. 7B, the disabling further includes a step 722 of storing the process identifier of the restore process in a storage location and a step 724 of allowing for the processing without filtering of filesystem requests to the encryption filter driver that have process identifiers matching entries stored in the storage location.

Restoring the Encrypted Computer File

Figure 8:
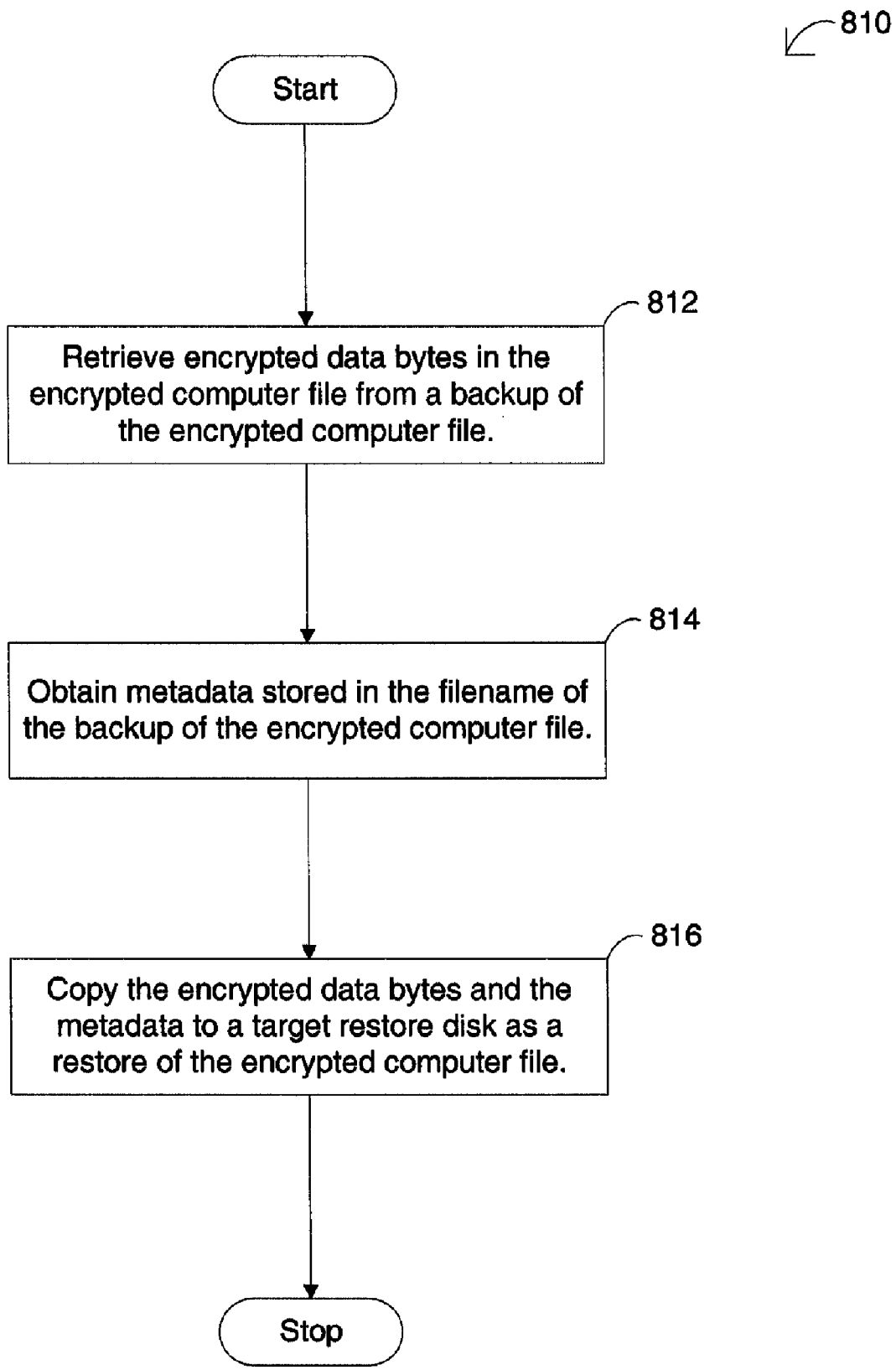
FIG. 8 is a flowchart of the restoring in accordance with an exemplary embodiment of the present invention.

Referring next to FIG. 8, in an exemplary embodiment, the restoring includes a step 812 of retrieving encrypted data bytes in the encrypted computer file from a backup of the encrypted computer file, a step 814 of obtaining metadata stored in the filename of the backup of the encrypted computer file, and a step 816 of copying the encrypted data bytes and the metadata to a target restore disk as a restore of the encrypted computer file.

Reenabling the Encryption Filter Driver

Figure 9A:
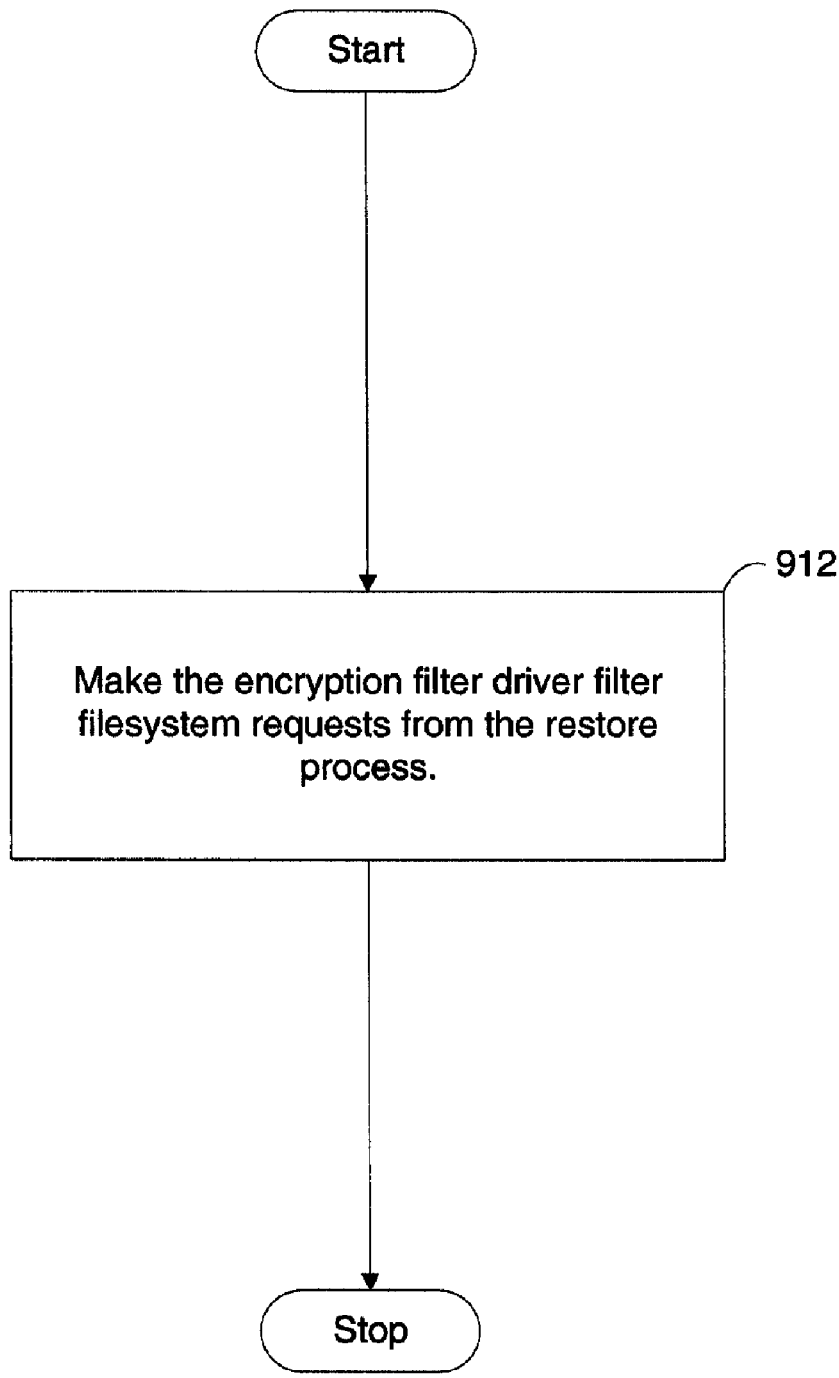
FIG. 9A is a flowchart of the reenabling step in accordance with an exemplary embodiment of the present invention.
Figure 9B:
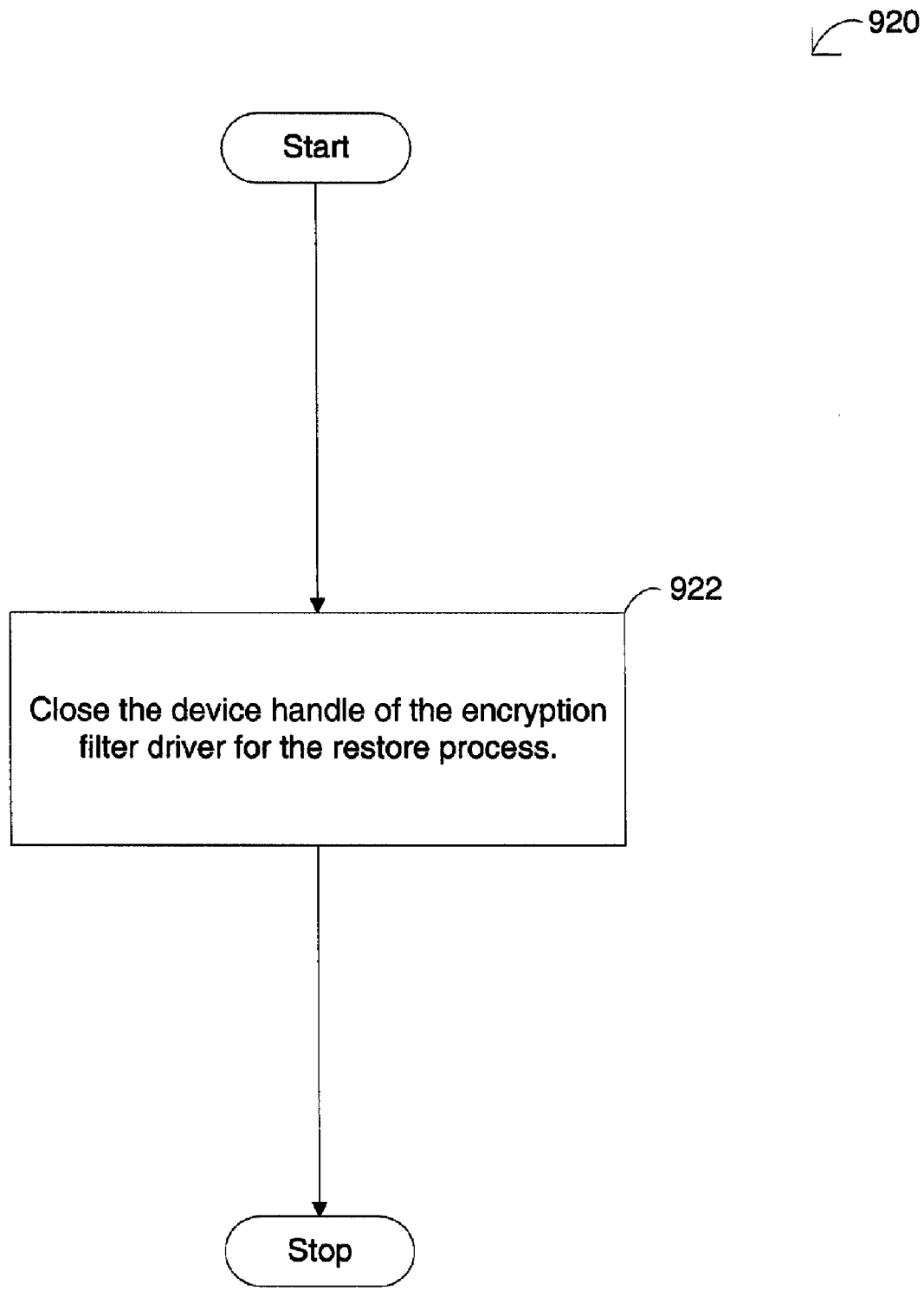
FIG. 9B is a flowchart of the making step in accordance with a specific embodiment of the present invention.

Referring next to FIG. 9A, in an exemplary embodiment, the reenabling includes a step 912 of making the encryption filter driver filter filesystem requests from the restore process. In a specific embodiment, as shown in FIG. 9B, making step 912 includes a step 922 of closing the device handle of the encryption filter driver for the restore process.

Figure 9C:
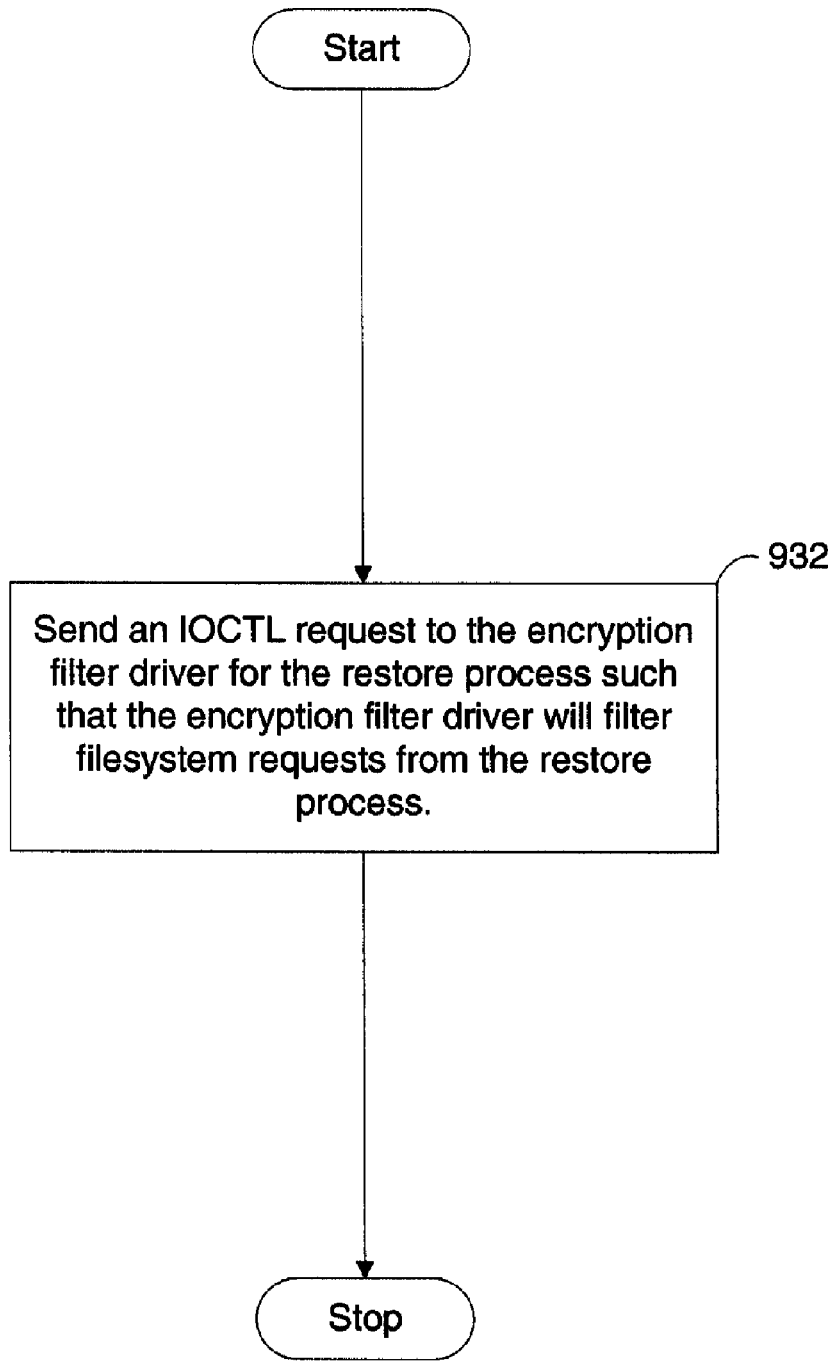
FIG. 9C is a flowchart of the making step in accordance with a specific embodiment of the present invention.

In a specific embodiment, as shown in FIG. 9C, making step 912 includes a step 932 of sending an IOCTL request to the encryption filter driver for the restore process such that the encryption filter driver will filter filesystem requests from the restore process. In a specific embodiment, the IOCTL is sent via Microsoft's DeviceIoControl API. In a specific embodiment, the IOCTL equals the following:

CTL_CODE(FILE_DEVICE_FFDRIVER, 0x0D, METHOD_BUFFERED, FILE_ANY_ACCESS).

In a specific embodiment, FILE_DEVICE_FFDRIVER equals 0x00008300.

Figure 9D:
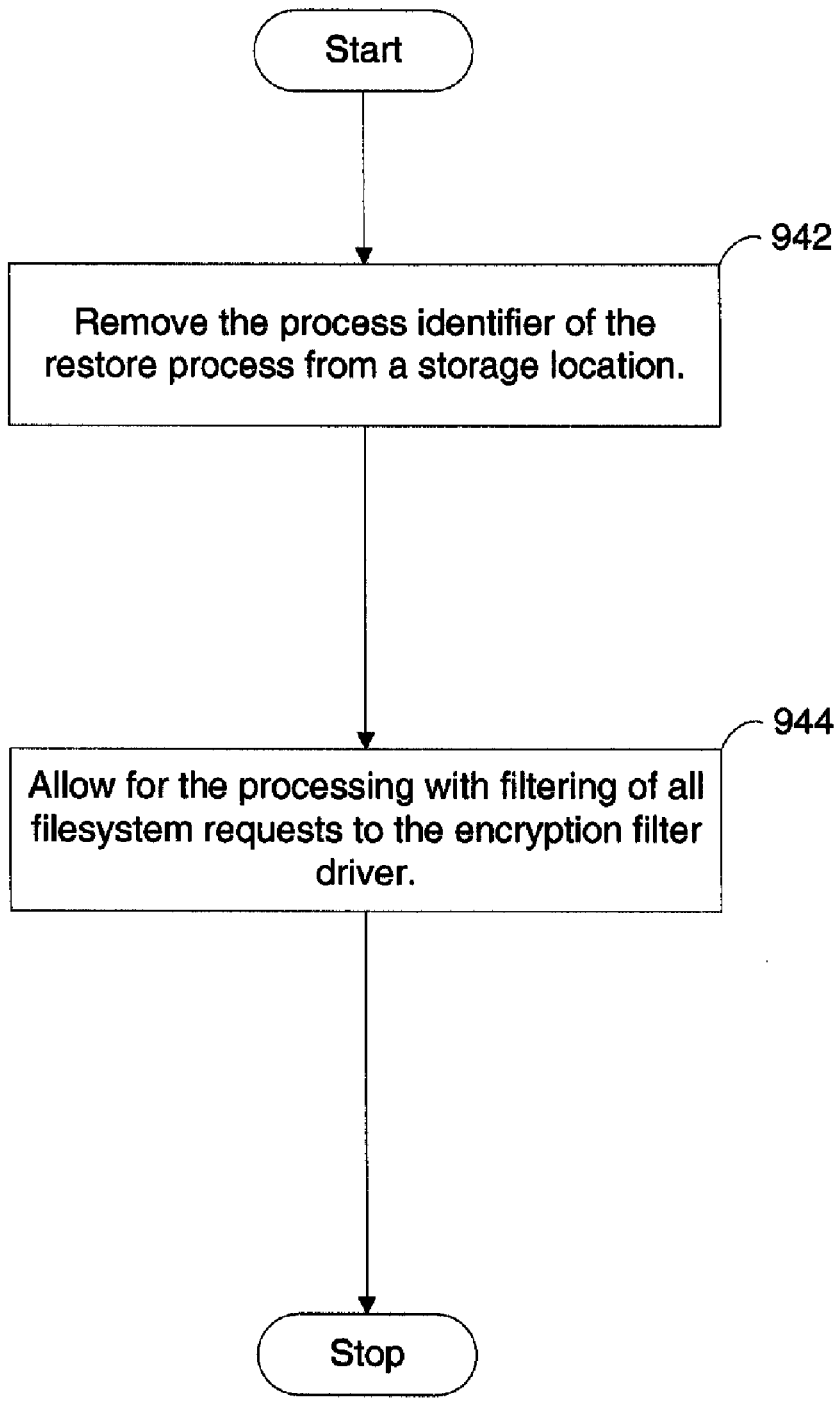
FIG. 9D is a flowchart of the reenabling step in accordance with a further embodiment of the present invention.

In a further embodiment, as shown in FIG. 9D, the reenabling further includes a step 942 of removing the process identifier of the restore process from a storage location and a step 944 of allowing for the processing with filtering of all filesystem requests to the encryption filter driver.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of backing up at least one encrypted computer file encrypted by an encryption filter driver running on an operating system of a computer system, the method comprising:

receiving the filename of the encrypted computer file;

starting a backup process for the encrypted computer file;

disabling the encryption filter driver for the backup process, wherein the disabling comprises sending a request to the encryption filter driver for the backup process such that the encryption filter driver will not filter filesystem requests from the backup process;

storing a process identifier of the backup process in a storage location;

allowing for the processing without filtering of filesystem requests to the encryption filter driver that have process identifiers matching entries stored in the storage location;

backing up the encrypted computer file via the backup process; and reenabling the encryption filter driver for the backup process.

2. The method of claim 1 wherein the backing up comprises:

retrieving encrypted data bytes in the encrypted computer file;

obtaining metadata stored in the filename of the encrypted computer file; and storing the encrypted data bytes and the metadata to disk as a backup of the encrypted computer file.

3. The method of claim 1 wherein the reenabling comprises making the encryption filter driver filter filesystem requests from the backup process.

4. The method of claim 3 wherein the making comprises closing the device handle of the encryption filter driver for the backup process.

5. The method of claim 3 wherein the making comprises sending an IOCTL request to the encryption filter driver for the backup process such that the encryption filter driver will filter filesystem requests from the backup process.

6. The method of claim 3 further comprising:
removing the process identifier of the backup process from a storage location; and
allowing for the processing with filtering of all filesystem requests to the encryption filter driver.

7. A method of backing up at least one encrypted computer file encrypted by a FFE encryption filter driver running on a Windows operating system of a computer system, the method comprising:
receiving the filename of the encrypted computer file;
starting a backup process for the encrypted computer file;
disabling the FFE encryption filter driver for the backup process wherein the disabling comprises sending an request to the encryption filter driver for the restore process such that the encryption filter driver will not filter filesystem requests from the restore process;
storing a process identifier of the restore process in a storage location;
allowing for the processing without filtering of filesystem requests to the encryption filter driver that have process identifiers matching entries stored in the storage location;
backing up the encrypted computer file via the backup process; and
reenabling the FFE encryption filter driver for the backup process.

8. A system comprising:
a processor;
a memory which stores code modules for execution on said processor, the modules comprising:
a receiving module configured to receive the filename of an encrypted computer file encrypted by an encryption filter driver running on an operating system of a computer system;
a starting module configured to start a backup process for the encrypted computer file;
a disabling module configured to disable the encryption filter driver for the backup process, wherein the disabling module comprises a sending module configured to send an request to the encryption filter driver for the backup process such that the encryption filter driver will not filter filesystem requests from the backup process;
a storing module configured to store a process identifier of the backup process in a storage location;
an allowing module configured to allow for the processing without filtering of filesystem requests the encryption filter driver that have process identifiers matching entries stored in the storage location;
a backing up module configured to back up the encrypted computer file via the backup process; and
a reenabling module configured to renewable the encryption filter driver for the backup process.

9. The system of claim 8 wherein the backing up module comprises:
a retrieving module configured to retrieve encrypted data bytes in the encrypted computer file;
an obtaining module configured to obtain metadata stored in the filename of the encrypted computer file; and
a storing module configured to store the encrypted data bytes and the metadata to disk as a backup of the encrypted computer file.

10. The system of claim 8 wherein the reenabling module comprises a making module configured to make the encryption filter driver filter filesystem requests from the backup process.

11. The system of claim 10 wherein the making module comprises a closing module configured to close the device handle of the encryption filter driver for the backup process.

12. The system of claim 10 wherein the making module comprises a sending module configured to send an IOCTL request to the encryption filter driver for the backup process such that the encryption filter driver will filter filesystem requests from the backup process.

13. The system of claim 10 further comprising:
a removing module configured to remove the process identifier of the backup process from a storage location; and
an allowing module configured to allow for the processing with filtering of all file system requests to the encryption filter driver.

14. A system comprising:
a processor;
a memory which stores code modules for execution on said processor, the modules comprising:
a receiving module configured to receive the filename of an encrypted computer file encrypted by a FFE encryption filter driver running on a Windows operating system of a computer system;
a starting module configured to start a backup process for the encrypted computer file;
a disabling module configured to disable the FFE encryption filter driver for the backup process, wherein the disabling module comprises a sending module configured to send an request to the encryption filter driver for the backup process such that the encryption filter driver will not filter filesystem requests from the backup process;
a storing module configured to store a process identifier of the backup process in a storage location;
an allowing module configured to allow for the processing without filtering of filesystem requests to the encryption filter driver that have process identifiers matching entries stored in the storage location;
a backing up module configured to back up the encrypted computer file via the backup process; and
a reenabling module configured to renewable the FFE encryption filter driver for the backup process.

15. A computer program product usable with a programmable computer having readable program code embodied therein of backing up at least one encrypted computer file encrypted by an encryption filter driver running on an operating system of a computer system, the computer program product comprising:
computer readable code for receiving the filename of the encrypted computer file;
computer readable code for starting a backup process for the encrypted computer file;
computer readable code for disabling the encryption filter driver for the backup process wherein the disabling comprises sending an request to the encryption filter driver for the restore process such that the encryption filter driver will not filter filesystem requests from the restore process;
computer readable code for storing a process identifier of the restore process in a storage location;
computer readable code for allowing for the processing without filtering of filesystem requests to the encryption filter driver that have process identifiers matching entries stored in the storage location;

computer readable code for backing up the encrypted computer file via the backup process; and computer readable code for reenabling the encryption filter driver for the backup process.

16. A method of providing a service to back up at least one encrypted computer file encrypted by an encryption filter driver running on an operating system of a computer system, the method comprising:

receiving the filename of the encrypted computer file;

starting a backup process for the encrypted computer file;

disabling the encryption filter driver for the backup process wherein the disabling comprises sending an request to the encryption filter driver for the restore process such that the encryption filter driver will not filter filesystem requests from the restore process;

storing a process identifier of the restore process in a storage location;

allowing for the processing without filtering of filesystem requests to the encryption filter driver that have process identifiers matching entries stored in the storage location;

backing up the encrypted computer file via the backup process; and reenabling the encryption filter driver for the backup process.

17. A method of restoring at least one encrypted computer file encrypted by an encryption filter driver running on an operating system of a computer system, the method comprising:

receiving the filename of the encrypted computer file;

starting a restore process for the encrypted computer file;

if the encryption filter driver is not enabled, copying the encrypted computer file via the restore process; and if the encryption filter driver is enabled, disabling the encryption filter driver for the restore process, wherein the disabling comprises sending an request to the encryption filter driver for the restore process such that the encryption filter driver will not filter filesystem requests from the restore process, storing a process identifier of the restore process in a storage location:

allowing for the processing without filtering of filesystem requests to the encryption filter driver that have process identifiers matching entries stored in the storage location, restoring the encrypted computer file via the restore process, and reenabling the encryption filter driver for the restore process.

18. The method of claim 17 wherein the restoring comprises:

retrieving encrypted data bytes in the encrypted computer file from a backup of the encrypted computer file;

obtaining metadata stored in the filename of the backup of the encrypted computer file; and copying the encrypted data bytes and the metadata to a target restore disk as a restore of the encrypted computer file.

19. The method of claim 17 wherein the reenabling comprises making the encryption filter driver filter filesystem requests from the restore process.

20. The method of claim 19 wherein the making comprises closing the device handle of the encryption filter driver for the restore process.

21. The method of claim 19 wherein the making comprises sending an IOCTL request to the encryption filter driver for the restore process such that the encryption filter driver will filter filesystem requests from the restore process.

22. The method of claim 19 further comprising:

removing the process identifier of the restore process from a storage location; and allowing for the processing with filtering of all filesystem requests to the encryption filter driver.

23. A method of restoring at least one encrypted computer file encrypted by a FFE encryption filter driver running on a Windows operating system of a computer system, the method comprising:

receiving the filename of the encrypted computer file;

starting a restore process for the encrypted computer file;

if the FFE encryption filter driver is not enabled, copying the encrypted computer file via the restore process; and if the FFE encryption filter driver is enabled, disabling the FFE encryption filter driver for the restore process, wherein the disabling comprises sending an request to the encryption filter driver for the restore process such that the encryption filter driver will not filter filesystem requests from the restore process, storing a process identifier of the restore process in a storage location;

allowing for the processing without filtering of filesystem requests to the encryption filter driver that have process identifiers matching entries stored in the storage location, restoring the encrypted computer file via the restore process, and reenabling the FFE encryption filter driver for the restore process.

24. A system comprising:

a processor;

a memory which stores code modules for execution on said processor, the modules comprising:

a receiving module configured to receive the filename of an encrypted computer file encrypted by an encryption filter driver running on an operating system of a computer system:

a starting module configured to start a restore process for the encrypted computer file;

a copying module configured to copy, if the encryption filter driver is not enabled, the encrypted computer file via the restore process;

a disabling module configured to disable, if the encryption filter driver is enabled, the encryption filter driver for the restore process, wherein the disabling module comprises a sending module configured to send an request to the encryption filter driver for the restore process such that the encryption filter driver will not filter filesystem requests from the restore process;

a storing module configured to store a process identifier of the restore process in a storage location;

an allowing module configured to allow for the processing without filtering of filesystem requests to the encryption filter driver that have process identifiers matching entries stored in the storage location;

a restoring module configured to restore, if the encryption filter driver is enabled, the encrypted computer file via the restore process; and a reenabling module configured to reenable, if the encryption filter driver is enabled, the encryption filter driver for the restore process.

25. The system of claim 24 wherein the restoring module comprises:

a retrieving module configured to retrieve encrypted data bytes in the encrypted computer file from a backup of the encrypted computer file;

a obtaining module configured to obtain metadata stored in the filename of the backup of the encrypted computer file; and a copying module configured to copy the encrypted data bytes and the metadata to a target restore disk as a restore of the encrypted computer file.

26. The system of claim 24 wherein the reenabling module comprises a making module configured to make the encryption filter driver filter filesystem requests from the restore process.

27. The system of claim 26 wherein the making module comprises a closing module configured to close the device handle of the encryption filter driver for the restore process.

28. The system of claim 26 wherein the making module comprises a sending module configured to send an IOCTL request to the encryption filter driver for the restore process such that the encryption filter driver will filter filesystem requests from the restore process.

29. The system of claim 26 further comprising:
a removing module configured to remove the process identifier of the restore process from a storage location; and
an allowing module configured to allow for the processing with filtering of all filesystem requests to the encryption filter driver.

30. A system comprising:
a processor;
a memory which stores code modules for execution on said processor, the modules comprising:
  a receiving module configured to receive the filename of an encrypted computer file encrypted by a FFE encryption filter driver running on a Windows operating system of a computer system;
  a starting module configured to start a restore process for the encrypted computer file;
  a copying module configured to copy, if the FFE encryption filter driver is not enabled, the encrypted computer file via the restore process;
  a disabling module configured to disable, if the FFE encryption filter driver is enabled, the FFE encryption filter driver for the restore process, wherein the disabling module comprises a sending module configured to send an request to the encryption filter driver for the restore process such that the encryption filter driver will not filter filesystem requests from the restore process;
  a storing module configured to store a process identifier of the restore process in a storage location;
  an allowing module configured to allow for the processing without filtering of filesystem requests to the encryption filter driver that have process identifiers matching entries stored in the storage location;
  a restoring module configured to restore, if the FFE encryption filter driver is enabled, the encrypted computer file via the restore process; and
  a reenabling module configured to reenable, if the FFE encryption filter driver is enabled, the FFE encryption filter driver for the restore process.

31. A computer program product usable with a programmable computer having readable program code embodied therein of restoring at least one encrypted computer file encrypted by an encryption filter driver running on an operating system of a computer system, the computer program product comprising:
computer readable code for receiving the filename of the encrypted computer file;
computer readable code for starting a restore process for the encrypted computer file;
computer readable code for copying, if the encryption filter driver is not enabled, the encrypted computer rile via the restore process;
computer readable code for disabling, if the encryption filter driver is enabled, the encryption filter driver for the restore process wherein the disabling comprises sending an request to the encryption filter driver for the restore process such that the encryption filter driver will not filter filesystem requests from the restore process;
computer readable code for storing process identifier of the restore process in a storage location;
computer readable code for allowing for the processing without filtering of filesystem requests to the encryption filter driver that have process identifiers matching entries stored in the storage location;
computer readable code for restoring, if the encryption filter driver is enabled, the encrypted computer file via the restore process; and
computer readable code for reenabling, if the encryption filter driver is enabled, the encryption filter driver for the restore process.

32. A method of backing up at least one encrypted computer file encrypted by an encryption filter driver running on an operating system of a computer system, the method comprising:
receiving the filename of the encrypted computer file;
starting a backup process for the encrypted computer file;
disabling the encryption filter driver for the backup process;
backing up the encrypted computer file via the backup process;
reenabling the encryption filter driver for the backup process wherein the reenabling comprises making the encryption filter driver filter filesystem requests from the backup process; and
wherein the method further comprises:
removing a process identifier of the backup process from a storage location; and
allowing for the processing with filtering of all filesystem requests to the encryption filter driver.

* * * * *

UNITED STATES PATENT AND TRADEMARK OFFICE
CERTIFICATE OF CORRECTION

PATENT NO.        : 7,600,133 B2                                                           Page 1 of 1
APPLICATION NO.   : 10/906568
DATED             : October 6, 2009
INVENTOR(S)       : Long et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Fifth Day of October, 2010

David J. Kappos
*Director of the United States Patent and Trademark Office*